(12) United States Patent
Okajima

(10) Patent No.: US 9,398,644 B2
(45) Date of Patent: Jul. 19, 2016

(54) RADIO-FREQUENCY HEATING APPARATUS AND RADIO-FREQUENCY HEATING METHOD

(75) Inventor: Toshiyuki Okajima, Shiga (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 747 days.

(21) Appl. No.: 13/382,318

(22) PCT Filed: Nov. 10, 2010

(86) PCT No.: PCT/JP2010/006581
§ 371 (c)(1),
(2), (4) Date: Jan. 5, 2012

(87) PCT Pub. No.: WO2011/070721
PCT Pub. Date: Jun. 16, 2011

(65) Prior Publication Data
US 2012/0103975 A1     May 3, 2012

(30) Foreign Application Priority Data

Dec. 9, 2009  (JP) .................................. 2009-279905

(51) Int. Cl.
*H05B 6/04* (2006.01)
*H05B 6/64* (2006.01)
(Continued)

(52) U.S. Cl.
CPC ............... *H05B 6/6447* (2013.01); *H05B 6/70* (2013.01); *H05B 6/705* (2013.01); *H05B 6/72* (2013.01); *Y02B 40/146* (2013.01)

(58) Field of Classification Search
CPC .......... H05B 6/6447; H05B 6/70; H05B 6/72; H05B 6/705; Y02B 40/146

USPC .......... 219/600, 660; 118/207–212, 299, 300
See application file for complete search history.

(56) References Cited

U.S. PATENT DOCUMENTS 3,569,657 A * 3/1971 Levinson ...................... 219/762
3,935,415 A * 1/1976 Moore .......................... 219/750
(Continued)

FOREIGN PATENT DOCUMENTS

| CN | 101502170 | 8/2009 |
|---|---|---|
| EP | 1 471 773 | 10/2004 |

(Continued)

OTHER PUBLICATIONS

International Search Report issued Feb. 15, 2011 in International (PCT) Application No. PCT/JP2010/006581.
(Continued)

*Primary Examiner* — Eric Stapleton
(74) *Attorney, Agent, or Firm* — Wenderoth, Lind & Ponack, L.L.P.

(57) ABSTRACT

A radio-frequency heating apparatus includes a phase varying unit to vary the phase of radio-frequency power; and a plurality of antennas which are placed on the same plane in a heating chamber and radiate a plurality of radio-frequency waves. The radio-frequency waves have a predetermined phase difference caused by phase variation in the phase varying unit. A geometry information acquisition unit acquires the geometry of an object; and a control unit controls the phase varying unit so that the radio-frequency waves are in phase in a first mode, and the radio-frequency waves are in opposite phase in a second mode. The control unit switches between the first mode and the second mode based on the acquired geometry information.

9 Claims, 24 Drawing Sheets

(51) Int. Cl.
*H05B 6/70* (2006.01)
*H05B 6/72* (2006.01)

(56) References Cited

U.S. PATENT DOCUMENTS

| | | | | |
|---|---|---|---|---|
| 3,985,946 | A * | 10/1976 | Werych | 373/128 |
| 4,104,804 | A * | 8/1978 | Sargeant | 34/262 |
| 4,177,035 | A * | 12/1979 | Buschermohle | 432/121 |
| 4,360,723 | A * | 11/1982 | Fukuda et al. | 219/711 |
| 4,439,929 | A * | 4/1984 | Kitagawa et al. | 34/254 |
| 4,567,340 | A * | 1/1986 | Latchum, Jr. | 219/701 |
| 4,687,895 | A * | 8/1987 | Chitre et al. | 219/701 |
| 4,868,357 | A | 9/1989 | Serikawa et al. | |
| 5,103,181 | A * | 4/1992 | Gaisford et al. | 324/637 |
| 5,656,081 | A * | 8/1997 | Isen et al. | 118/46 |
| 5,758,575 | A * | 6/1998 | Isen et al. | 101/153 |
| 5,968,587 | A * | 10/1999 | Frankel | 427/8 |
| 6,010,771 | A * | 1/2000 | Isen et al. | 428/209 |
| 6,015,465 | A | 1/2000 | Kholodenko et al. | 118/719 |
| 6,104,005 | A * | 8/2000 | Adamski et al. | 219/409 |
| 6,132,671 | A * | 10/2000 | Beall et al. | 264/630 |
| 6,157,014 | A * | 12/2000 | Goranson | 219/700 |
| 6,246,040 | B1 * | 6/2001 | Gunn | 219/771 |
| 6,281,469 | B1 * | 8/2001 | Perrin et al. | 219/121.43 |
| 6,348,099 | B1 * | 2/2002 | Xia et al. | 118/697 |
| 6,382,964 | B2 * | 5/2002 | Sakamoto et al. | 432/171 |
| 6,396,172 | B1 * | 5/2002 | Couture | 307/125 |
| 6,552,295 | B2 * | 4/2003 | Markunas et al. | 219/121.36 |
| 6,717,120 | B2 * | 4/2004 | Fritts et al. | 219/700 |
| 6,887,339 | B1 * | 5/2005 | Goodman et al. | 156/345.28 |
| 7,886,690 | B2 * | 2/2011 | Ellingboe | 118/723 E |
| 2003/0205571 | A1 * | 11/2003 | Flugstad et al. | 219/497 |
| 2004/0206755 | A1 | 10/2004 | Hadinger | |
| 2005/0051526 | A1 * | 3/2005 | Potts et al. | 219/132 |
| 2006/0016806 | A1 * | 1/2006 | Cristiani | 219/749 |
| 2007/0075072 | A1 * | 4/2007 | Roussy | 219/695 |
| 2009/0194526 | A1 * | 8/2009 | Buchanan | 219/600 |
| 2009/0236315 | A1 * | 9/2009 | Willwerth et al. | 216/67 |
| 2009/0289056 | A1 * | 11/2009 | Suenaga et al. | 219/702 |
| 2010/0065554 | A1 * | 3/2010 | Suenaga et al. | 219/702 |
| 2010/0089908 | A1 * | 4/2010 | Suenaga et al. | 219/702 |
| 2010/0176121 | A1 * | 7/2010 | Nobue et al. | 219/716 |
| 2012/0097665 | A1 * | 4/2012 | Bilchinsky et al. | 219/661 |

FOREIGN PATENT DOCUMENTS

| | | |
|---|---|---|
| JP | 56-132793 | 10/1981 |
| JP | 63-259327 | 10/1988 |
| JP | 6-272869 | 9/1994 |
| JP | 7-130463 | 5/1995 |
| JP | 2004-340513 | 12/2004 |
| JP | 2006-196336 | 7/2006 |
| JP | 2008-146967 | 6/2008 |
| JP | 2008-282691 | 11/2008 |
| JP | 2009-138954 | 6/2009 |
| JP | 2009-238402 | 10/2009 |
| JP | 2009-252346 | 10/2009 |
| JP | 2009-259511 | 11/2009 |
| WO | 2008/115226 | 9/2008 |

OTHER PUBLICATIONS

An Extended European Search Report issued Oct. 15, 2013 for the corresponding European patent application No. 10835652.8.

* cited by examiner

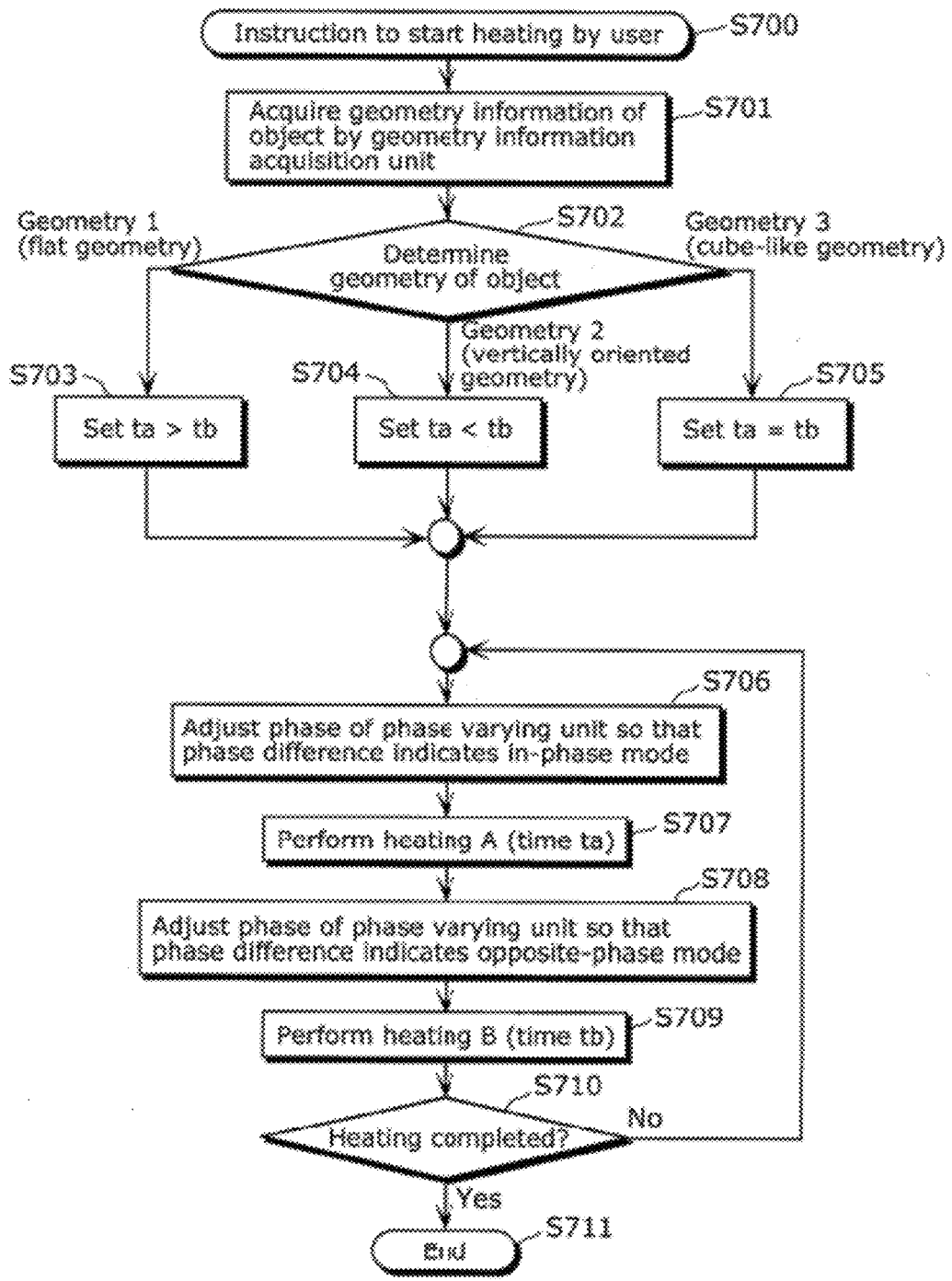

FIG. 16

| Lh/Lv | ≥3 | 2.5 | 2 | 1.5 | 1 | 0.7 | 0.6 | 0.4 | ≤0.3 |
|---|---|---|---|---|---|---|---|---|---|
| ta (sec) | Always | 2 | 2 | 1.5 | 1 | 1 | 1 | 0.5 | — |
| tb (sec) | — | 0.5 | 1 | 1 | 1 | 1.5 | 2 | 2 | Always |

RADIO-FREQUENCY HEATING APPARATUS AND RADIO-FREQUENCY HEATING METHOD

BACKGROUND OF INVENTION

1. Technical Field

The present invention relates to a radio-frequency heating apparatus and a radio-frequency heating method for heating an object placed in a heating chamber.

2. Background Art

Conventionally, in order to improve heating efficiency and eliminate uneven heating and provide uniform heating for a radio-frequency heating apparatus which heats an object such as food using radio-frequency power, various techniques have been disclosed for providing local heating based on the state and geometry of the object, and for stirring radiated radio-frequency power in a heating chamber.

For example, Patent Literature 1 discloses a microwave oven which has a radiation antenna on the outer periphery of an emission antenna. In the microwave oven, by rotating an emission antenna, a state in which the emission antenna is radio-frequency coupled with the radiation antenna, and a state in which the emission antenna is not radio-frequency coupled with the radiation antenna are controlled, and apparent size of the antenna is changed so that a state in which microwave is supplied to a small region in a concentrated manner, and a state in which microwave is uniformly distributed are controlled.

In addition, Patent Literature 2 discloses a microwave oven which is provided with a plurality of rotation antennas and a unit to detect a temperature distribution of an object. This microwave oven detects the temperature distribution of the object, and determines a portion of the object to be heated based on the detected temperature distribution information, and rotates a rotation antenna accordingly to control the directivity of the antenna.

In addition, Patent Literature 3 discloses a microwave oven which is provided with a plurality of flat antennas, and varies the phase of the microwave to be supplied to the flat antennas, then changes the directivity of the microwave radiated from the flat antennas, thereby stirring the microwave without using a stirrer.

CITATION LIST

Patent Literature

[PTL 1]
Japanese Unexamined Patent Application Publication No. 2004-340513
[PTL 2]
Japanese Unexamined Patent Application Publication No. 2008-282691
[PTL 3]
Japanese Unexamined Patent Application Publication No. 7-130463

SUMMARY OF INVENTION

However, in the conventional configuration, especially Patent Literatures 1 and 2, the geometry and direction of the antennas are physically changed, and thus a device which mechanically drives the antennas is needed. This configuration causes the apparatus to increase in size and cost. In addition, because of the employed mechanical drive, the location of each antenna is unstable and the probability of failure tends to increase.

On the other hand, in Patent Literature 3, because the directivity of the microwave is controlled electrically, above-mentioned unstable elements due to mechanical configuration and/or a configuration leading to size increase of the apparatus may be avoided. However, when the microwave is stirred, the distribution of the electromagnetic field intensity in the entire heating chamber becomes an averaged, uniform distribution state independently of the geometry of the object. That is to say, the region where the object exists is not heated in a concentrated manner, and thus the microwave is wasted, thereby providing no direct improvement in heating efficiency. That is to say, heating of an object requires long time.

In a small closed space like a microwave oven, the microwaves radiated from an antenna are reflected in the heating chamber in a complicated manner. Therefore, even when the directivity of the antenna is controlled, the behavior of the microwave radiated from the antenna is completely different from the directivity of a far-field in free space. Consequently, it is difficult to control a heat distribution by controlling the directivity of the antenna.

The present invention solves the above-described conventional problems, and it is an object of the present invention to provide a radio-frequency heating apparatus and a radio-frequency heating method that can heat an object efficiently and uniformly according to the geometry of the object in the radio-frequency heating apparatus which heats an object placed in a heating chamber.

In order to solve the above-mentioned conventional problems, a radio-frequency heating apparatus according to one aspect of the present invention is a radio-frequency heating apparatus for heating an object placed in a heating chamber, and includes: a radio-frequency power generation unit configured to generate radio-frequency power; a phase varying unit configured to vary a phase of radio-frequency power generated by the radio-frequency power generation unit; a plurality of antennas which are placed on a same plane in the heating chamber and radiate a plurality of radio-frequency waves to the object, the radio-frequency waves having a predetermined phase difference caused by phase variation in the phase varying unit; a geometry information acquisition unit configured to acquire geometry information indicating a geometry of the object; and a control unit configured to control the phase varying unit so that the radio-frequency waves are in phase in a first mode, and configured to control the phase varying unit so that the radio-frequency waves are in opposite phase in a second mode, wherein the control unit is configured to switch between the first mode and the second mode based on the geometry information acquired by the geometry information acquisition unit.

With this configuration, radio-frequency power is radiated from a plurality of antennas with an appropriate phase difference based on the geometry information of an object acquired by the geometry information acquisition unit. Consequently, a distribution of intensity of an electromagnetic field composed of a standing wave, which is suitable to the geometry of the object may be formed in the heating chamber, and thus the object may be efficiently and uniformly heated in accordance with the geometry of the object.

In the case where the plurality of radio-frequency waves radiated from a plurality of antennas are in phase, the distribution of the intensity of the electromagnetic field in the heating chamber has the same intensity area extending in the direction parallel to the same plane on which a plurality of antennas are placed, and thus is layered in the vertical direction. On the other hand, when the plurality of radio-frequency waves radiated from a plurality of antennas are in opposite phase, the distribution has the same intensity area extending in the direction vertical to the same plane on which a plurality of antennas are placed, and thus is layered in the horizontal direction. The object is efficiently and uniformly heated when the distribution of the intensity of the electromagnetic field composed of a standing wave in the heating chamber matches with the geometry of the object. Thus, by generating the distribution of the intensity of the electromagnetic field composed of a standing wave in the heating chamber based on the geometry information as described above, the object may be efficiently and uniformly heated.

In addition, it preferable that when the radio-frequency waves are in phase, the predetermined phase difference is substantially 0 degree, and when the radio-frequency waves are in opposite phase, the predetermined phase difference is substantially 180 degrees.

In addition, the control unit may be configured to switch between the first mode and the second mode during heating so that a ratio between a time period for the first mode and a time period for the second mode is increased in accordance with an increase in a ratio between a dimension of the object in a direction parallel to the same plane, and a dimension of the object in a direction perpendicular to the same plane.

Accordingly, the greater the ratio between the dimension of the object in the parallel direction to the same plane on which a plurality of antennas are placed and the dimension of the object in the direction perpendicular to the plane, the distribution of the intensity of the electromagnetic field composed of a standing wave in the heating chamber has the same intensity area extending in the direction parallel to the same plane, and thus is layered in the vertical direction. Consequently, the distribution of the electromagnetic field intensity is well suited to the geometry of the object, and thus the object can be uniformly heated securely with efficiency.

In addition, the control unit may be configured to switch to the first mode when a ratio between the dimension of the object in a direction parallel to the same plane, and the dimension of the object in a direction perpendicular to the same plane is greater than or equal to a first value which is greater than 1, and may be configured to switch to the second mode when the ratio is less or equal to a second value which is less than 1.

Accordingly, the object can be heated uniformly with efficiency in a simple manner without performing complicated control by the control unit.

In addition, the control unit may be configured to switch between the first mode and the second mode during heating so as to set the time period for the first mode to be approximately equal to the time period for the second mode when the ratio between the dimension of the object in a direction parallel to the same plane, and the dimension of the object in a direction perpendicular to the same plane is substantially 1.

Accordingly, even in the case where the dimension of the object in the direction perpendicular to the same plane on which a plurality of antennas are placed and the dimension of the object in the direction parallel to the same plane are equal, the object can be heated uniformly with efficiency.

In addition, the control unit may be configured to identify the ratio between the dimension of the object in a direction parallel to the same plane, and the dimension of the object in a direction perpendicular to the same plane based on the geometry information acquired by the geometry information acquisition unit, and to switch between the first mode and the second mode based on the identified ratio.

In addition, the same plane is a bottom surface or a top surface of the heating chamber, the control unit may be configured to switch to the first mode when the object is a food served on a plate, and may be configured to switch to the second mode when the object is sake in a sake bottle.

Accordingly, without performing complicated control by the control unit, food served on a flat plate, or sake in a sake bottle can be heated a uniformly with efficiency.

In addition, the control unit may alternately repeat the first mode and the second mode.

Accordingly, in the first mode, the object on the cross-section with a plane parallel to the same plane on which a plurality of antennas are placed is heated uniformly with efficiency, while in the second mode, the object on the cross-section with a plane perpendicular to the same plane is heated uniformly with efficiency. That is to say, in the first mode and the second mode altogether, the object is heated uniformly with efficiency on the whole.

In addition, the geometry information acquisition unit may be a sensor which detects a contour shape and dimensions of the object.

Accordingly, accurate geometry information of the object can be obtained. The geometry information includes, for example, the base area and the height of the object.

In addition, the geometry information acquisition unit may be a geometry selection button which receives designation of a geometry of the object by a user.

Accordingly, the geometry information acquisition unit can be simplified and the control can be also simplified.

In addition, the antennas may be flat antennas.

With this configuration, the antenna can be installed in a small space, the apparatus can be miniaturized.

In addition, a radio-frequency heating apparatus according to another aspect of the present invention is a radio-frequency heating apparatus for heating an object placed in a heating chamber, and includes: a radio-frequency power generation unit configured to generate radio-frequency power; a phase varying unit configured to vary a phase of radio-frequency power generated by the radio-frequency power generation unit; a plurality of antennas which are placed on a same plane in the heating chamber and are configured to radiate a plurality of radio-frequency waves to the object, the radio-frequency waves having a predetermined phase difference caused by phase variation in the phase varying unit; and a control unit configured to control the phase varying unit so that the radio-frequency waves are in phase in a first mode, and configured to control the phase varying unit so that the radio-frequency waves are in opposite phase in a second mode, wherein the control unit is configured to alternately switch between the first mode and the second mode.

With this configuration, an infrared sensor, a geometry selection in button operated by a user, and the like are not needed. In addition, control based on the geometry information of the object is not necessary, and thus the cost can be reduced and the apparatus can be miniaturized. Furthermore, by alternately switching between the first mode in which the plurality of radio-frequency waves are in phase, and the second mode in which the plurality of radio-frequency waves are in opposite phase, efficient, uniform, and stable heating can be achieved consistently without significantly depending on the geometry of the object and arrangement of the object in the heating chamber.

The present invention can be achieved not only as an apparatus but also a radio-frequency heating method which includes the steps performed by the processing units that constitutes the apparatus.

With the radio-frequency heating apparatus and radio-frequency heating method of the present invention, an object can be uniformly heated with efficiency according to the geometry of the object.

Figure 14A:
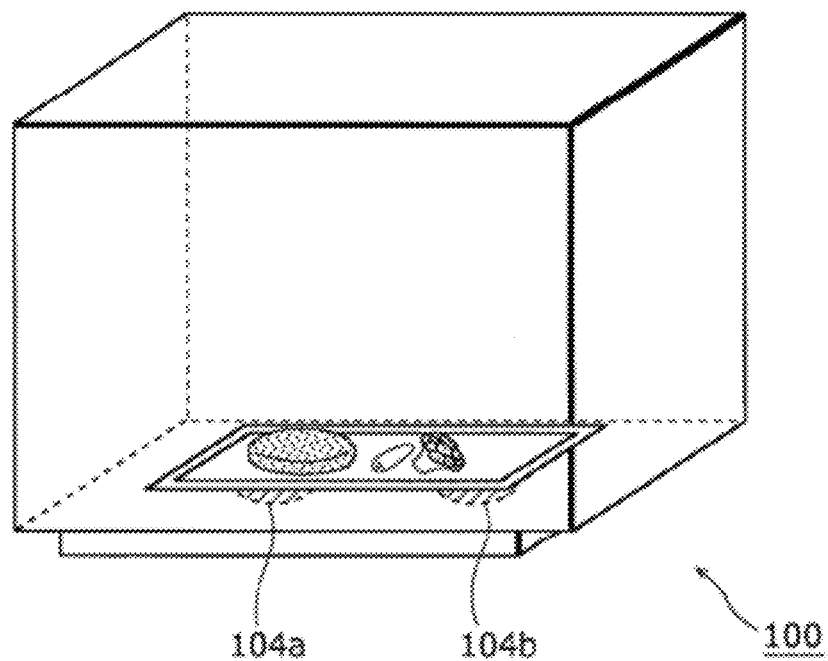
FIG. 14A is a diagram schematically showing an example of the manner how a flat-shaped object is placed in the heating chamber of the radio-frequency heating apparatus.
Figure 14B:
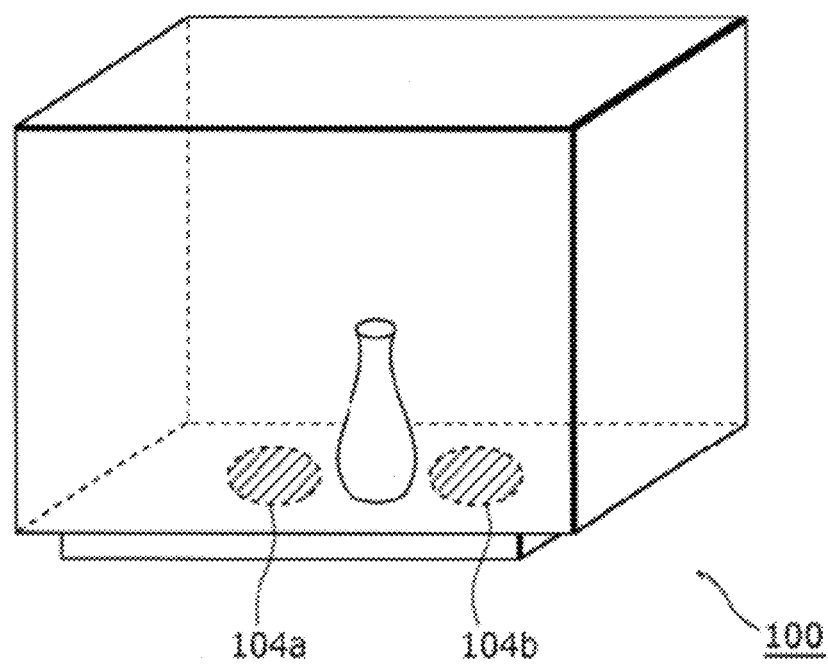

to FIG. 14B is a diagram schematically showing an example of the manner how a vertically oriented object is placed in the heating chamber of the radio-frequency heating apparatus.

FIG. 15 is a flowchart showing the control procedure of a second operation of the radio-frequency heating apparatus according to Embodiment 1.

FIG. 16 is a diagram showing an example of a matrix with which heating operation time periods ta and tb are determined based on geometry information in Embodiment 1.

Figure 17:
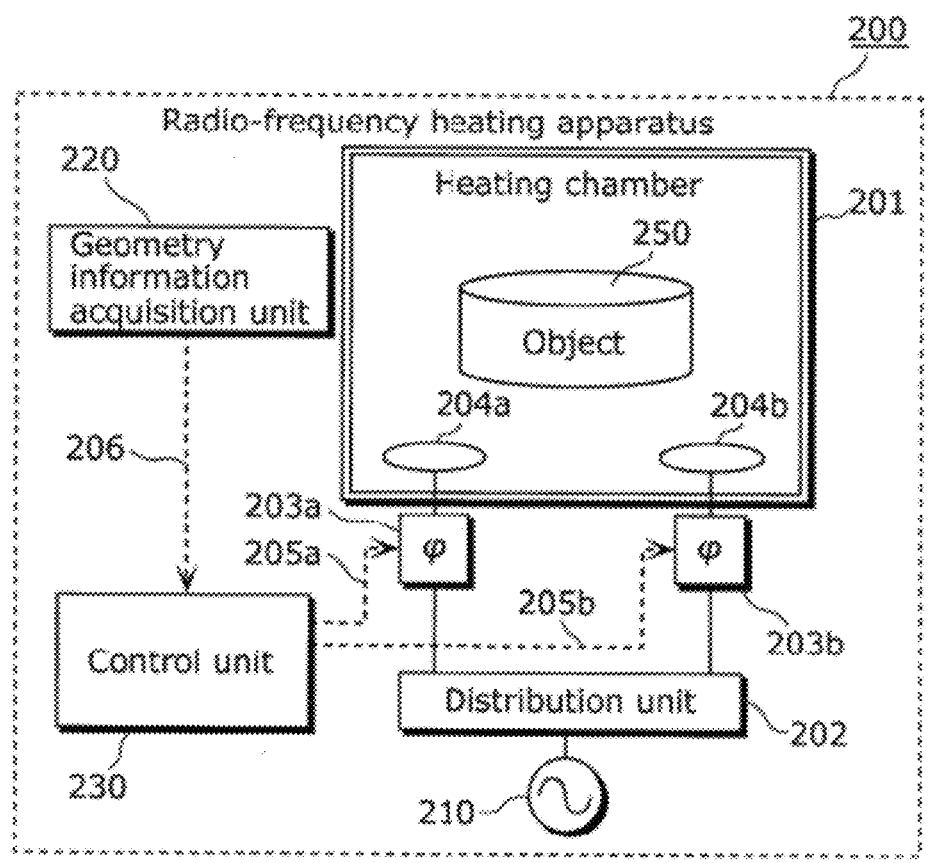

FIG. 17 is a block diagram showing the basic configuration of a radio-frequency heating apparatus according to Embodiment 2.

Figure 18:
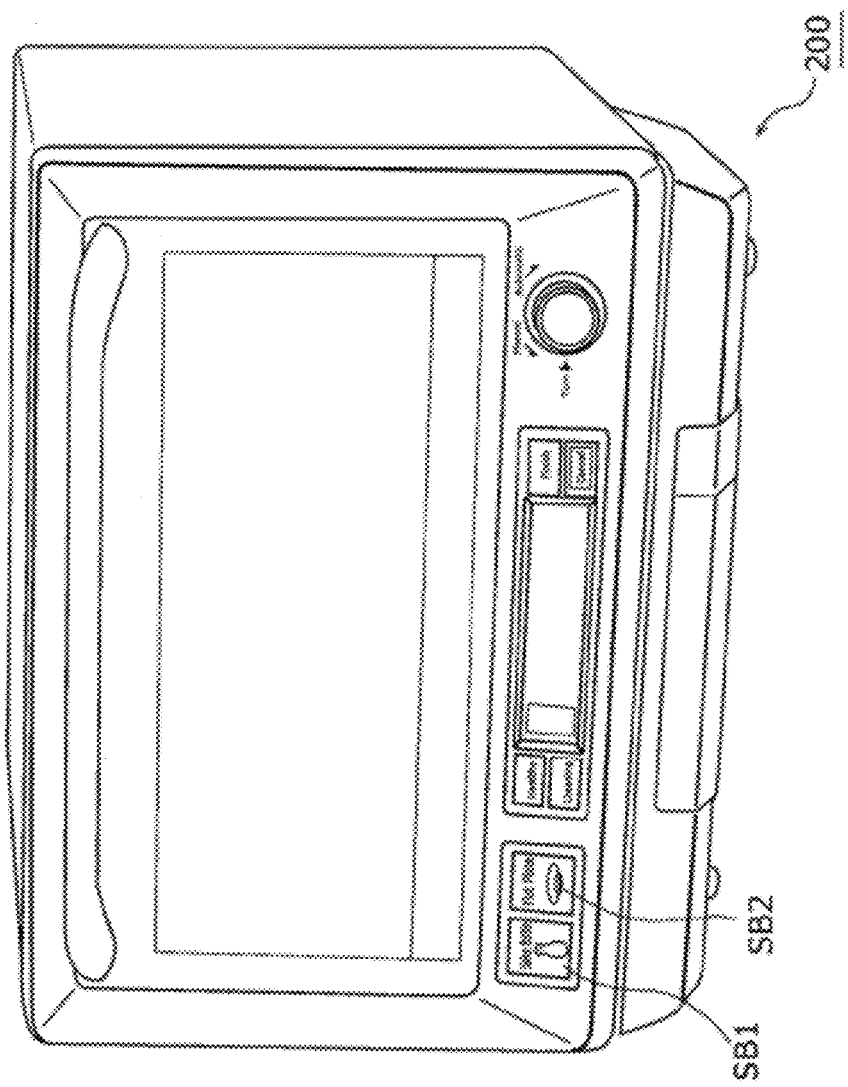

FIG. 18 is an overall perspective view of the radio-frequency heating apparatus having a geometry selection button, according to Embodiment 2.

Figure 19:
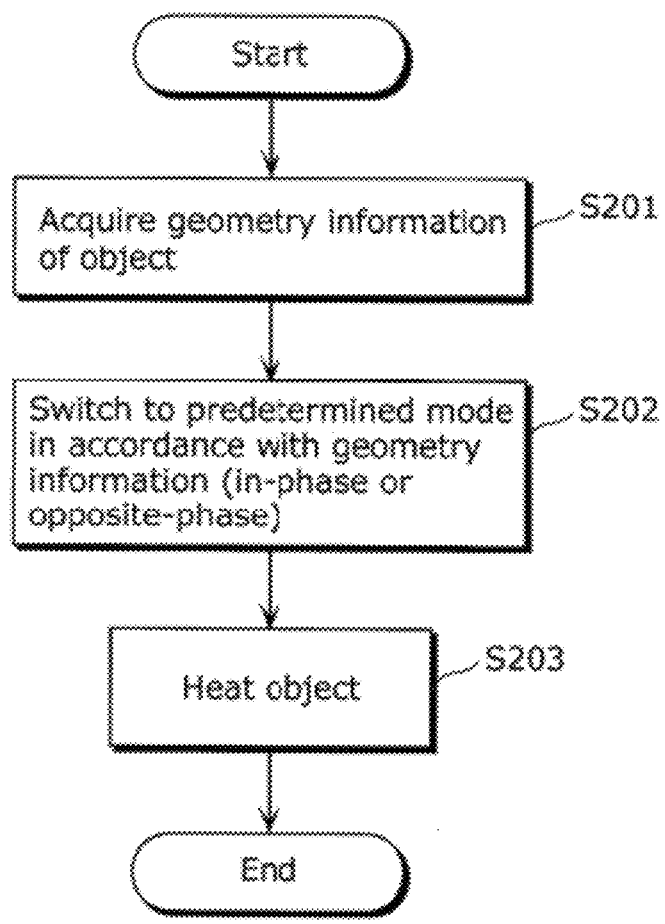

FIG. 19 is a flowchart showing the basic operation of the radio-frequency heating apparatus according to Embodiment 2.

Figure 20:
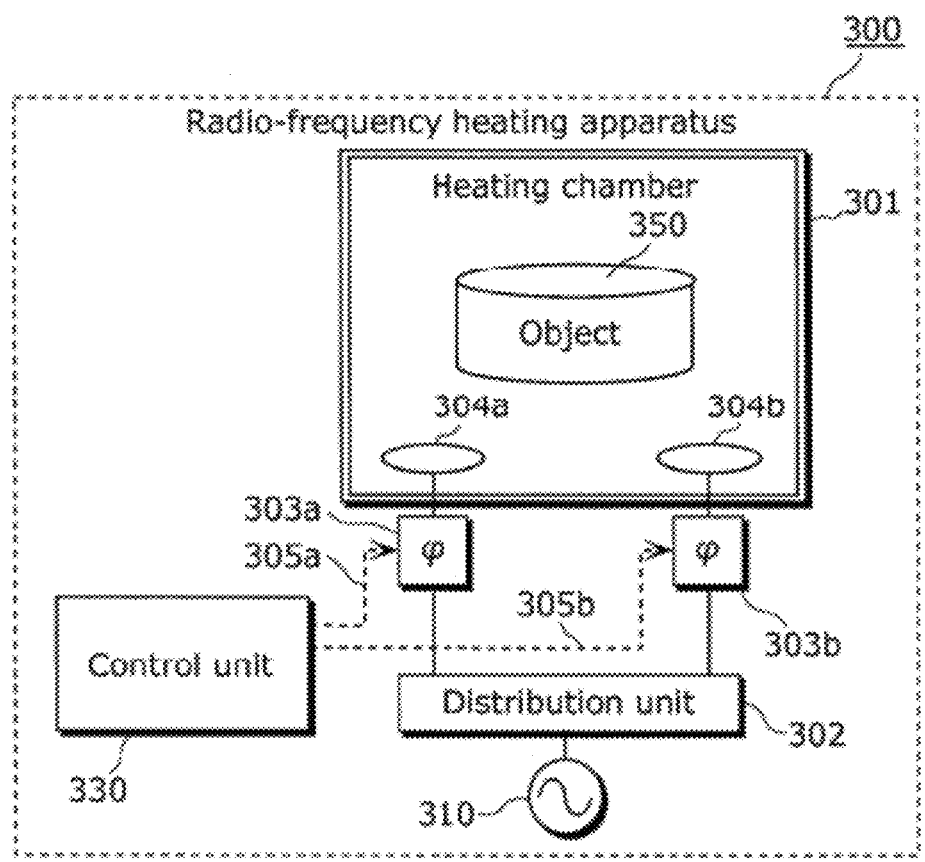

FIG. 20 is a block diagram showing the basic configuration of a radio-frequency heating apparatus according to Embodiment 3.

Figure 21:
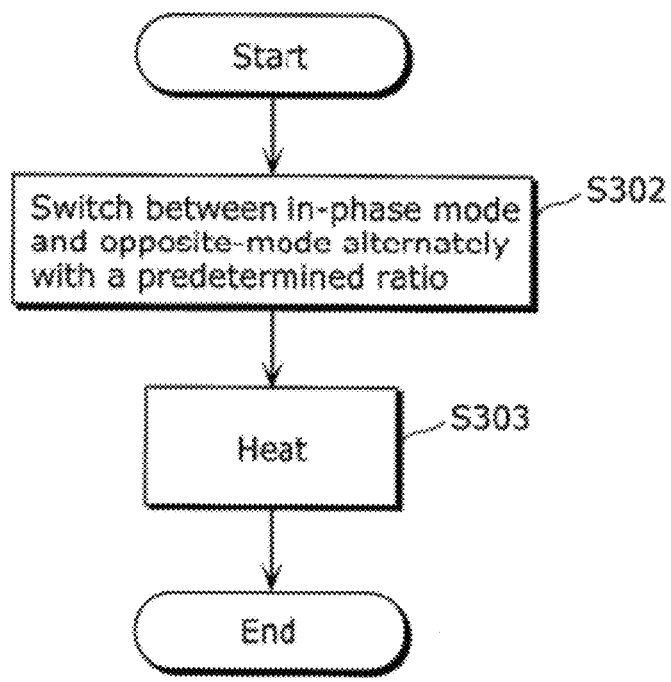

FIG. 21 is a flowchart showing the basic operation of the radio-frequency heating apparatus according to Embodiment 3.

DETAILED DESCRIPTION OF INVENTION

[Embodiment 1]

A radio-frequency heating apparatus according to Embodiment 1 of the present invention is a radio-frequency heating apparatus for heating an object placed in a heating chamber, and includes: a radio-frequency power generation unit configured to generate radio-frequency power; a phase varying unit configured to vary a in phase of radio-frequency power generated by the radio-frequency power generation unit; a plurality of antennas which are placed on a same plane in the heating chamber and radiate a plurality of radio-frequency waves to the object, the radio-frequency waves having a predetermined phase difference caused by phase variation in the phase varying unit; a geometry information acquisition unit configured to acquire geometry information indicating a geometry of the object; and a control unit configured to control the phase varying unit so that the radio-frequency waves are in phase in a first mode, and configured to control the phase varying unit so that the radio-frequency waves are in opposite phase in a second mode, wherein the control unit is configured to switch between the first mode and the second mode based on the geometry information acquired by the geometry information acquisition unit.

With this configuration, the radio-frequency heating apparatus according to Embodiment 1 of the present invention radiates radio-frequency waves from a plurality of antennas with an appropriate phase difference based on the geometry information of an object acquired by the geometry information acquisition unit. Consequently, a distribution of the intensity of the electromagnetic field composed of a standing wave, which is suitable to the geometry of the object can be formed in the heating chamber, the object can be uniformly heated with efficiency in accordance with the geometry of the object.

Hereinafter, Embodiment 1 of the present invention is described with reference to the drawings.

Figure 1:
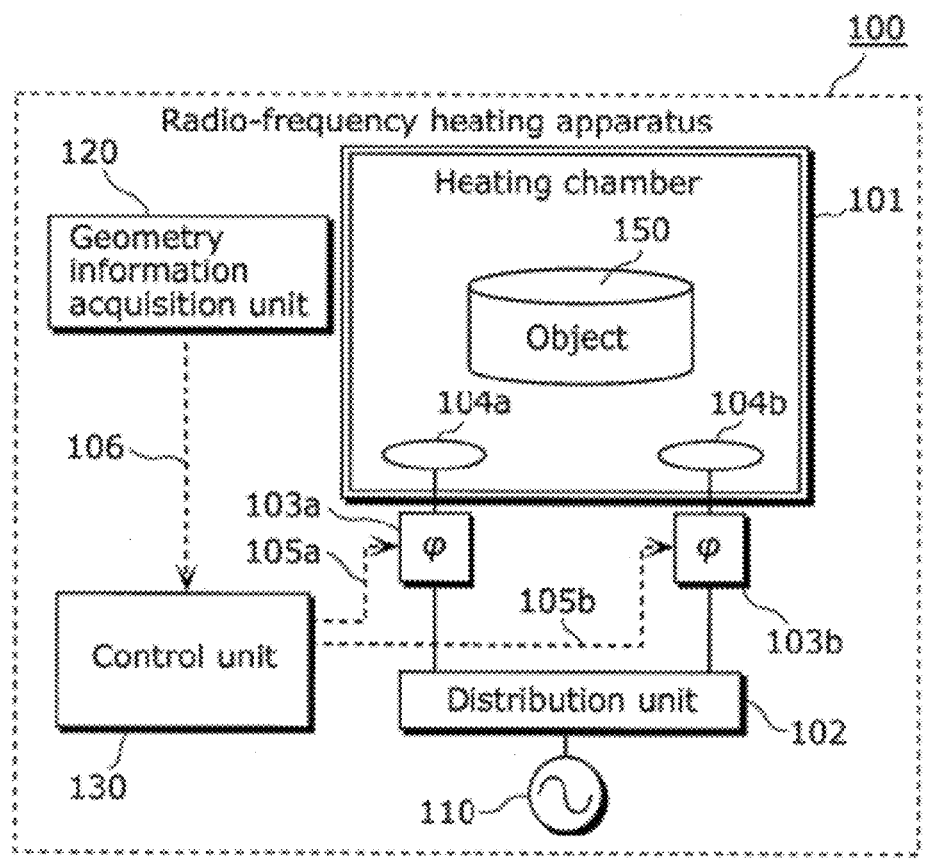
FIG. 1 is a block diagram showing the basic configuration of a radio-frequency heating apparatus according to Embodiment 1.

FIG. 1 is a block diagram showing the basic configuration of a radio-frequency heating apparatus 100 according to Embodiment 1. In FIG. 1, an object 150 which is heated by the radio-frequency heating apparatus 100 is also shown.

The radio-frequency heating apparatus 100 includes a heating to chamber 101, a distribution unit 102, a first and second phase varying units 103a, 103b, a first antenna 104a, a second antenna 104b, a radio-frequency power generation unit 110, a geometry information acquisition unit 120, and a control unit 130. In FIG. 1, the radio-frequency heating apparatus 100 has two antennas and two phase varying units, however, the number of antennas and phase varying units is not limited to this. Hereinafter, the first phase varying unit 103b, the second phase varying unit 103b, the first antenna 104a, and the second antenna 104b may be expressed as the phase varying unit 103b, the phase varying unit 103b, the antenna 104a, and the antenna 104b, respectively.

The heating chamber 101 is a housing in which an object 150 is placed and is composed of, for example, metal.

The distribution unit 102 distributes the radio-frequency power generated by the radio-frequency power generation unit 110 into two parts. As the distribution unit 102, a wilkinson divider may be used, or any of a hybrid coupler and a resistor divider may be used.

The phase varying units 103a, 103b change respective phases of the radio-frequency power inputted via the distribution unit 102 into the phases designated by the control unit 130, and radiate respective radio-frequency waves to the heating chamber via corresponding antennas 104a, 104b. That is to say, the phase varying units 103a, 103b change respective phases of inputted radio-frequency power, thereby generating a predetermined phase difference between two radio-frequency waves radiated from the antennas 104a, 104b. Specifically, the phase varying units 103a, 103b change the respective phases of the radio-frequency power in accordance with phase setting signals 105a, 105b each indicating the phase setting inputted from the control unit 130. For example, a bit step variable phase shifter or a continuous variable phase shifter may be used as the phase varying units 103a, 103b.

A bit step variable phase shifter (for example, 3-bit step variable phase shifter) is used for digital control, and the amount of phase shift in several steps is controlled stepwise by a combination of channel switching. The amount of phase shift is determined based on the phase setting signals 105a, 105b each indicating the phase setting inputted from the outside.

On the other hand, a continuous variable phase shifter is used for analog voltage control, and is known as, for example, a loaded-line phase shifter using a transmission line or a hybrid-coupled phase shifter using a 90-hybrid coupler. In each phase shifter, reflection phases of two resonant circuits are changed by varying the reverse bias voltage of a varactor diode, and thus inserted phase shift between input and output is changed. The amount of the inserted phase shift is determined based on the phase setting signals 105a, 105b each indicating the phase setting inputted from the outside.

The antennas 104a and 104b are provided in one-to-one correspondence with the phase varying units 103a and 103b, and radiate radio-frequency waves having a predetermined phase difference, which is generated by the corresponding phase varying units 103a, 103b. The antennas 104a and 104b are mounted in the bottom surface of the heating chamber 101. In FIG. 1, the antennas 104a and 104b are mounted in the bottom surface of the heating chamber 101, however the configuration is not limited to this, and as long as all the antennas are mounted on the same surface, the antennas may be mounted on the top surface, a lateral surface, or the back surface. In addition, a flat antenna such as a circular patch antenna or a rectangular patch antenna may be used for the antennas 104a and 104b. Consequently, the antennas 104a and 104b can be made thin and compact, and thus the degree of freedom in the design of the apparatus increases, while the apparatus is reduced in size and cost.

The radio-frequency power generation unit 110 generates in radio-frequency power having a predetermined frequency. The radio-frequency power generated by the radio-frequency power generation unit 110 is input to the phase varying units 103a and 103b via the distribution unit 102. The specific configuration of the radio-frequency power generation unit 110 is described later.

The geometry information acquisition unit 120 acquires the geometry information indicating the geometry of an object 150, and outputs a geometry information signal 106 representing the acquired geometry information to the control unit 130. Specifically, the geometry information acquisition unit 120 is disposed inside the Radio-Frequency heating apparatus 100 as a single unit or as multiple units, and serves as, for example, an infrared sensor or a laser sensor which detects the geometry of the object 150 in a noncontact manner. The infrared sensor or the laser sensor irradiates an object with infrared rays or a laser beam, and obtains the geometry information of the object by detecting reflected rays. The technology of infrared sensor or laser sensor is publicly known, and in addition to a point sensor and a line sensor, recently, a variety of two-dimensional sensors and three-dimensional sensors are available on the market.

The control unit 130 controls the phase varying units 103a and 103b so that the radio-frequency waves radiated from the antenna 104a and the radio-frequency waves radiated from the antenna 104b in the first mode are in phase, and the radio-frequency waves radiated from the antenna 104a and the radio-frequency waves radiated from the antenna 104b in the second mode are in opposite-phase. Specifically, in-phase means that the phase difference between the radio-frequency waves radiated from the antenna 104a and the radio-frequency waves radiated from the antenna 104b is 0 degree, and opposite-phase means that the phase difference between the radio-frequency waves radiated from the antenna 104a and the radio-frequency waves radiated from the antenna 104b is 180 degrees.

Specifically, the control unit 130 is connected to first phase varying unit 103a and the second phase varying unit 103b via the control line, and controls the phases of the respective radio-frequency waves radiated from the antennas 104a and 104b. More specifically, the control unit 130 outputs the phase setting signals 105a and 105b to the first phase varying unit 103a and the second phase varying unit 103b, respectively, the phase setting signals 105a and 105b each indicating the phase setting.

Accordingly, the control unit 130 controls the phase varying units 103a and 103b to generate a phase difference of 0 degree between the phases of the radio-frequency waves radiated from antenna 104a and the radio-frequency waves radiated from the antenna 104b in the first mode, and to generate a phase difference of 180 degrees in the second mode. In the following description, the state in which the phase settings of the phase varying units 103a and 103b are determined so as to generate a difference of 0 degree between the phases of the respective radio-frequency waves radiated from the antennas 104a and 104b is referred to as an in-phase mode. On the other hand, the state in which the phase settings of the phase varying units 103a and 103b are determined so as to generate a difference of 180 degrees between the phases of the respective radio-frequency waves radiated from the antennas 104a and 104b is referred to as an opposite-phase mode. That is to say, the first mode matches the period in the in-phase mode, and the second mode matches the period in the opposite-phase mode.

The control unit 130 identifies the ratio between the dimension of the object 150 in the direction parallel to the plane on which the antennas 104a and 104b are placed, and the dimension of the object 150 in the direction perpendicular to the plane, based on the geometry information that is acquired by the geometry information acquisition unit 120, and switches between the first mode and the second mode based on the identified ratio.

For example, as shown in FIG. 1, in the case where the antennas 104a to and 104b are placed in the bottom surface of the heating chamber 101, the control unit 130 may identify the ratio between the dimension of the projected view of the object 150 on one of the lateral surfaces of the heating chambers 101, and the dimension of the projected view of the object 150 on the bottom surface, and may determine the period is for the in-phase mode and the period for the opposite-phase mode based on the identified ratio.

In this manner, the control unit 130 identifies the ratio between the dimension of the projected view of the object 150 on one of the lateral surfaces of the heating chambers 101, and the dimension of the projected view of the object 150 on the bottom surface, and determines the period for the in-phase mode and the period for the opposite-phase mode based on the identified ratio. In addition, the control unit 130 controls the phase varying units 103a and 103b so that the phase difference between the radio-frequency waves radiated from the antenna 104a and the radio-frequency waves radiated from the antenna 104b in the in-phase mode is 0 degree, and the difference in the opposite-phase mode is 180 degrees.

Next, the specific configuration of the radio-frequency power generation unit 110 is described.

Figure 2:
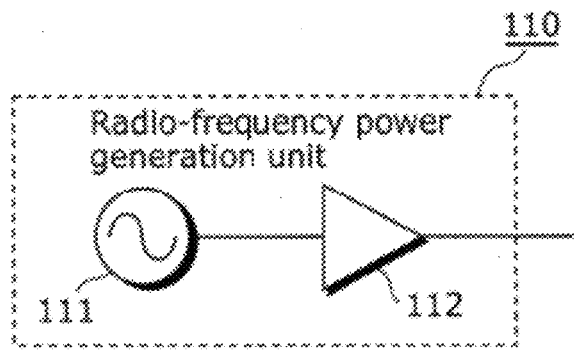
FIG. 2 is a block diagram showing the specific configuration of a radio-frequency power generation unit.

FIG. 2 is a block diagram showing the specific configuration of the radio-frequency power generation unit 110.

The radio-frequency power generation unit 110 shown in the figure has an oscillation unit 111 and an amplification unit 112.

The oscillation unit 111 is a general radio-frequency oscillator circuit which includes a semiconductor amplifying device such as a transistor, and a resonant circuit such as a tank circuit. The configuration of the oscillation unit 111 is publicly known, and a Hartley oscillator circuit, or a Colpitts oscillator circuit may be used.

The amplification unit 112 is, for example, a transistor which amplifies the radio-frequency power generated by the oscillation unit 111.

In addition, the radio-frequency power generation unit 110 may be configured to serve as a variable frequency power generation unit using a phase locked loop (PLL).

Figure 3:
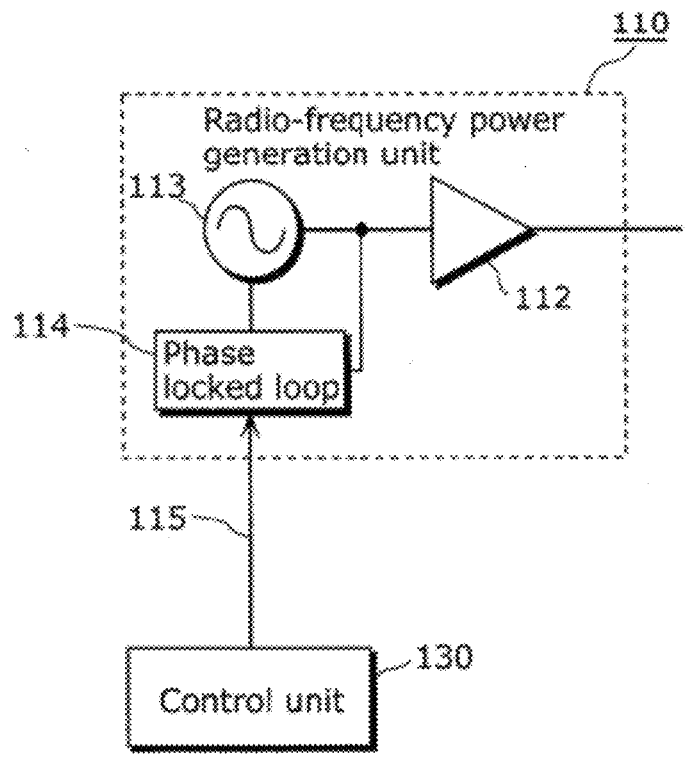
FIG. 3 is a block diagram showing the specific configuration of a radio-frequency power generation unit using PLL.

FIG. 3 is a block diagram showing the specific configuration of the radio-frequency power generation unit 110 using PLL.

The radio-frequency power generation unit 110 shown in the figure has an oscillation unit 113, a phase locked loop 114, and an amplification unit 112.

The oscillation unit 113 is, for example, a VCO (Voltage Controlled Oscillator) which generates a radio-frequency signal having a frequency according to the voltage outputted from the phase locked loop 114.

The phase locked loop 114 adjusts its output voltage so that the frequency of the radio-frequency power generated by the oscillation unit 113 has the same value as a frequency control signal 115 inputted from the control unit 130, which indicates a frequency setting. The amplification unit 112 is, for example, a transistor which amplifies the radio-frequency power generated by the oscillation unit 113.

As described above, with the configuration as shown in FIGS. 2 and 3, the radio-frequency power generation unit 110 generates radio-frequency power having a predetermined frequency. Although a single amplification unit 112 is shown as a power amplifier in FIGS. 2 and 3, a plurality of power amplifiers may be provided in a multi-stage series connection or a parallel connection configuration in order to obtain high and large output power.

The radio-frequency heating apparatus 100 according to the present in embodiment with the above configuration switches between the in-phase mode and the opposite-phase mode based on the geometry information acquired by the geometry information acquisition unit 120. Specifically, the geometry information indicates the ratio between the dimension of the object 150 in the direction parallel to the bottom surface, and the dimension of the object 150 in the direction perpendicular to the bottom surface.

Next, the operation of the radio-frequency heating apparatus 100 according to the present embodiment is described.

Figure 4:
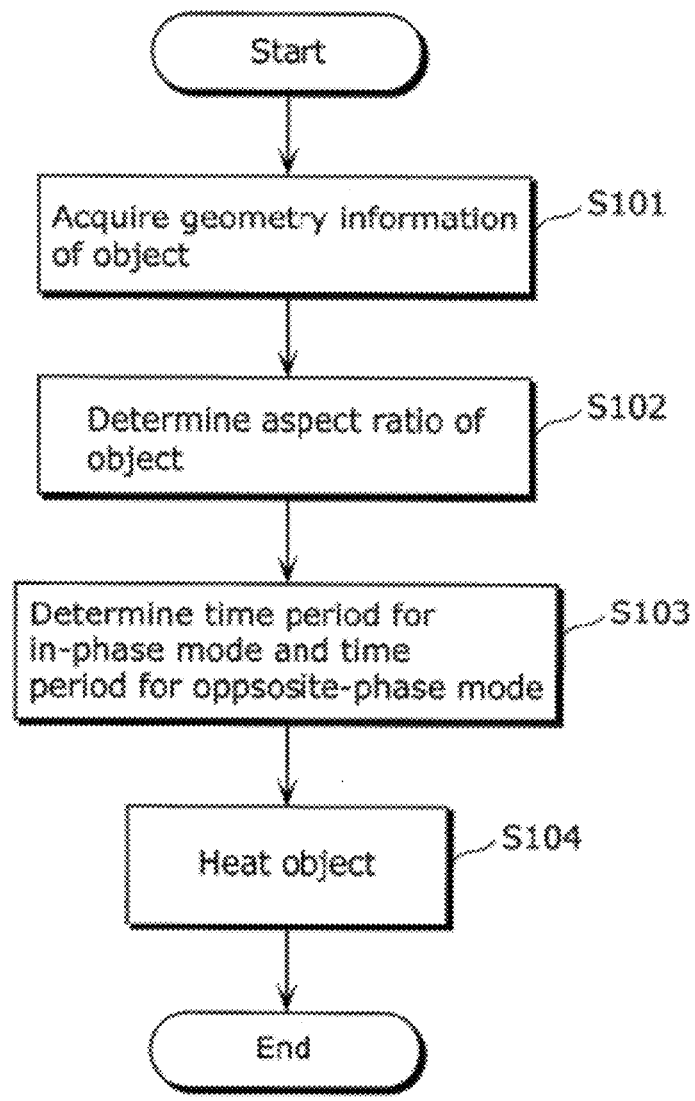
FIG. 4 is a flowchart showing the basic operation of the radio-frequency heating apparatus according to Embodiment 1.

FIG. 4 is a flowchart showing the basic operation of the radio-frequency heating apparatus 100.

First, the geometry information acquisition unit 120 acquires the geometry information of the object 150 (step S101). As described above, the geometry information acquisition units 120 is, for example, an infrared laser sensor or a laser sensor, and acquires the geometry information of the object 150. The geometry information acquisition unit 120 outputs the geometry information signal 106 representing the acquired geometry information to the control unit 130.

Next, the control unit 130 identifies the aspect ratio of the lateral view of the object 150 based on the geometry information signal 106 inputted from the geometry information acquisition unit 120 (step S102). Specifically, the aspect ratio is the ratio of the horizontal dimension to the vertical dimension of the object 150. That is to say, the control unit 130 identifies the ratio between the dimension of the object 150 in the direction parallel to the plane on which the antennas 104a and 104b are placed, and the dimension of the object 150 in the direction horizontal to the plane.

Here, in the control unit 130, the horizontal dimension of the object 150 is defined by, for example, the longest distance between two points on the projection view of the object 150 on one of the lateral in surfaces, the two points in the direction parallel to the bottom surface. Alternatively, the horizontal dimension may be defined by the longest distance between two points on the projection view of the object 150 on the bottom surface. On the other hand, the vertical dimension of the object 150 is defined by, for example, the longest distance between two points on the projection view of the object 150 on one of the lateral surfaces, the two points in the direction vertical to the bottom surface. Otherwise, the vertical dimension may be the maximum height of the cross-sectional views in the direction perpendicular to the bottom surface of the object 150.

Next, the control unit 130 determines the time period for the in-phase mode and the time period for the opposite-phase mode in accordance with the aspect ratio of the object 150 identified by identification process (step S102).

Finally, the control unit 130 maintains the in-phase mode and the opposite-phase mode for respective determined time periods, and thus the object 150 is heated accordingly (step S104).

As described above, the radio-frequency heating apparatus 100 according to the present embodiment is a radio-frequency heating apparatus for heating an object 150 placed in a heating chamber 101, and includes: a radio-frequency power generation unit 110 configured to generate radio-frequency power; phase varying units 103a, 103b configured to vary a phase of radio-frequency power generated by the radio-frequency power generation unit 110; a plurality of antennas 104a, 104b which are placed on a same plane in the heating chamber 101 and radiate a plurality of radio-frequency waves to the object 150, the radio-frequency waves having a predetermined phase difference caused by phase variation in the phase varying units 103a, 103b; a geometry information acquisition unit 120 configured to acquire geometry information indicating a geometry of the object 150; and a control unit 130 configured to control the phase varying units 103a, 103b so that the radio-frequency waves are in phase in a first mode, to and configured to control the phase varying units 103a, 103b so that the radio-frequency waves are in opposite phase in a second mode, wherein the control unit 130 is configured to switch between the first mode and the second mode based on the geometry information acquired by the geometry information acquisition unit 120.

With this configuration, radio-frequency waves are radiated from a plurality of antennas 104a and 104b with an appropriate phase difference based on the geometry information of the object 150 acquired by the geometry information acquisition unit 120. Consequently, a distribution the intensity of the electromagnetic field composed of a standing wave that is suitable to the geometry of the object 150 may be formed in the heating chamber 101, and thus the object 105 may be efficiently, evenly and uniformly heated in accordance with the geometry of the object 150.

Specifically, the radio-frequency heating apparatus 100 identifies the ratio between the dimension of the object 150 in the direction parallel to the same plane on which the antennas 104a and 104b are placed, and the dimension of the object 150 in the direction perpendicular to the same plane, and makes a plurality of radio-frequency waves in phase or the in opposite phase. Here, when the plurality of radio-frequency waves are in phase, the distribution of the intensity of the electromagnetic field in the heating chamber 101 has the same intensity area extending in the direction parallel to the same plane on which the antennas 104a and 104b are placed, and thus is layered in the vertical direction. On the other hand, when the plurality of radio-frequency waves are in opposite phase, the distribution has the same intensity area extending in the direction perpendicular to the same plane on which the antennas 104a and 104b are placed, and thus is layered in the horizontal direction. The object 150 is efficiently and uniformly heated when the distribution of the intensity of the electromagnetic field composed of a standing wave in the heating chamber 101 matches with the geometry of the object 150. Thus, as described above, the radio-frequency heating apparatus 100 in identifies the ratio between the dimension of the object 150 in the direction parallel to the same plane on which the antennas 104a and 104b are placed, and the dimension of the object 150 in the direction perpendicular to the same plane, and thus the object 150 may be efficiently and uniformly heated by generating a distribution of the intensity of the electromagnetic field composed of a standing wave according to the identified ratio in the heating chamber 101.

Hereinafter, the distributions of the intensity of the electromagnetic field composed of a standing wave, which are generated in the heating chamber 101 in the in-phase mode and in the opposite-phase mode are described along with an example of the basic operation of above-described radio-frequency heating apparatus 100.

(First Operation)

First, the first operation as an example of the basic operation of the above-described radio-frequency heating apparatus 100 is described.

When the aspect ratio of the object 150 identified by the control unit 130 is greater than or equal to a first value which is greater than 1, the operation makes a plurality of radio-frequency waves radiated from the antennas 104a and 104b in phase, while when the aspect ratio is less than or equal to a second value which is less than 1, the operation makes a plurality of radio-frequency waves radiated from the antennas 104a and 104b in opposite phase. That is to say, when the aspect ratio of the object 150 is greater than or equal to the first value, the radio-frequency waves are radiated in the in-phase mode, while the aspect ratio is less than or equal to the second value, the radio-frequency waves are radiated in the opposite-phase mode. Furthermore, when the aspect ratio is greater than the second value and less than the first value, the radio-frequency waves are alternately radiated in the in-phase mode and in the opposite-phase mode repeatedly.

Figure 5:
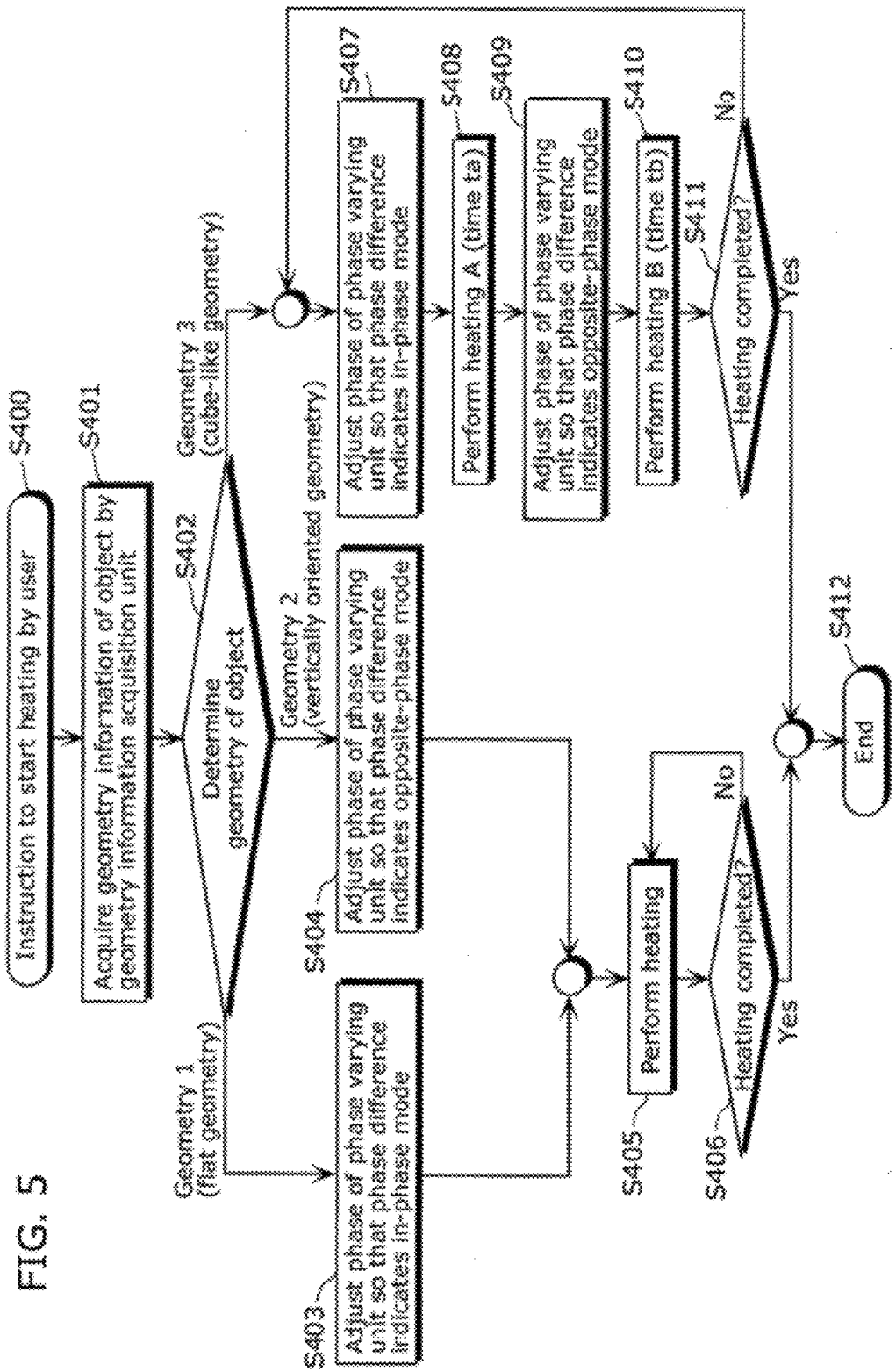
FIG. 5 is a flowchart showing the control procedure of a first operation of the radio-frequency heating apparatus according to Embodiment 1.

FIG. 5 is a flowchart showing the control procedure of the first operation of the radio-frequency heating apparatus 100 in FIG. 1. The radio-frequency heating apparatus 100 of FIG. 1 performs the following processing in the control unit 130.

First, when the object 150 is placed in the heating chamber 101 and an operation to start heating process is performed by a user (step S400), the control unit 130 operates the geometry information acquisition unit 120 to acquire the geometry information of the object 150 (step S401). Here, the process of acquiring the geometry information of the object 150 (step S401) corresponds to the process of acquiring the geometry information of the object 150 shown in FIG. 4 (step S101).

Next, the geometry of the object 150 is determined based on the geometry information signal 106 inputted from the geometry information acquisition unit 120 (step S402). Specifically, it is determined whether the object 150 has a flat geometry (geometry 1), vertically oriented geometry (geometry 2), or cube-like geometry (geometry 3) by identifying the aspect ratio of the object 150. For example, the control unit 130 determines that the object 150 has a flat geometry when the identified ratio is greater than or equal to 3, or determines that the object 150 has a vertically oriented geometry when the identified ratio is less than or equal to 0.3, or determines that the object 150 has a cube-like geometry when the identified ratio is greater than 0.3 and less than 3. The threshold values by which the control unit 130 determines the geometry of the object 150 are not limited to these values, and the object 150 may be determined to be flat geometry when the identified ratio is greater than or equal to 2, or the object 150 may be determined to be vertically oriented geometry when the identified ratio is less than or equal to 0.5, or the object 150 may be determined to be cube-like geometry when the identified ratio is greater than 0.5 and less than 2. Here, the process of determining the geometry information of the object 150 (step S402) corresponds to the process of determining the geometry information of the object 150 shown in FIG. 4 (step S102).

When the geometry of the object 150 determined based on the geometry information signal 106 is flat (horizontally oriented) geometry (geometry 1 in step S402), the phases of the phase varying units 103a and 103b are adjusted (step S403) so that the phase difference between the respective radio-frequency waves radiated from the antennas 104a and 104b indicates the in-phase mode, and then heating process is performed (step S405). Here, performing heating process specifically means that radio-frequency waves are radiated from the antennas 104a and 104b in the in-phase mode. Thus, the object 150 is heated. The process performed when the geometry of the object 150 determined based on the geometry information signal 106 is flat geometry (geometry 1 in step S402) corresponds to the process performed when the time period for the opposite-phase mode is determined to be 0 in the process of determining the time period for the in-phase mode and the time period for the opposite-phase mode (step S103) in FIG. 4.

Next, the control unit 130 determines whether or not heating of the object 150 is completed (step S406), and when the heating is not completed (No in step S406), the heating process is continued (step S405). On the other hand, when the heating is completed (Yes in step S406), the whole process is terminated (step S412). For example, the control unit 130 measures the temperature of the object 150 using a temperature sensor in a noncontact manner, and determines that heating is completed when the measured temperature exceeds a predetermined temperature (for example, 80 degrees). Alternatively, the control unit 130 may acquire a heating time which is preset by a user, for example, and may determine that heating of the object 150 is completed when an elapsed time after the start of heating process reaches the heating time preset by the user.

In this manner, in the first operation, when the geometry of the object 150 is flat geometry, the radio-frequency heating apparatus 100 always adjusts the phase difference so as to set the in-phase mode, the phase difference between the radio-frequency waves radiated from the antennas 104a and 104b. In other words, when the identified aspect ratio is greater than or equal to the first value, the radio-frequency heating apparatus 100 sets the time period for the opposite-phase mode to be 0 by adjusting the phase difference between the radio-frequency waves radiated from the antennas 104a and 104b.

Now, the distribution of the intensity of an electromagnetic field in the heating chamber 101 is described, the electromagnetic field being composed of a standing wave when the phase difference between the respective radio-frequency waves radiated from the antennas 104a and 104b indicates the in-phase mode. Hereinafter, the distribution of the intensity of the electromagnetic field in the heating chamber 101 in the in-phase mode, the electromagnetic field being composed of a standing wave is described using FIGS. 6A to 9B. The distance between the antenna 104a and the antenna 104b and/or the number of antennas are different in the following pairs of figures: FIG. 6A and FIG. 6B, FIG. 7A and FIG. 7B, FIG. 8B and FIG. 8B, and FIG. 9A and FIG. 9B. In these figures, a difference exists only in the distance between antennas and the number of antennas, however the size of the heating chamber 101, and the frequency of the radio-frequency waves radiated from each antenna are the same between the figures.

Figure 6A:
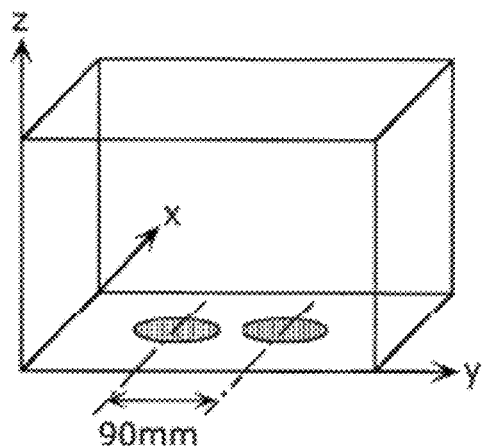
FIG. 6A is a perspective view schematically showing the configuration of a radio-frequency heating apparatus, in which the center distance between adjacent antennas is 90 mm.

FIG. 6A is a perspective view schematically showing the configuration of the radio-frequency heating apparatus 100, in which the center distance between adjacent antennas is 90 mm.

In the radio-frequency heating apparatus 100 shown in the figure, two antennas 104a and 104b which are each formed of a circular patch having a diameter of 64.6 mm are disposed in the same bottom surface of the heating chamber 101 with the distance between the antenna centers of 90 mm. In the heating chamber 101, the width (y dimension) is 410 mm, the depth (x dimension) is 314 mm, and the height (z dimension) is 230 mm, and the frequency of the radio-frequency waves radiated from the antennas 104a and 104b is 2450 MHz.

Figure 6B:
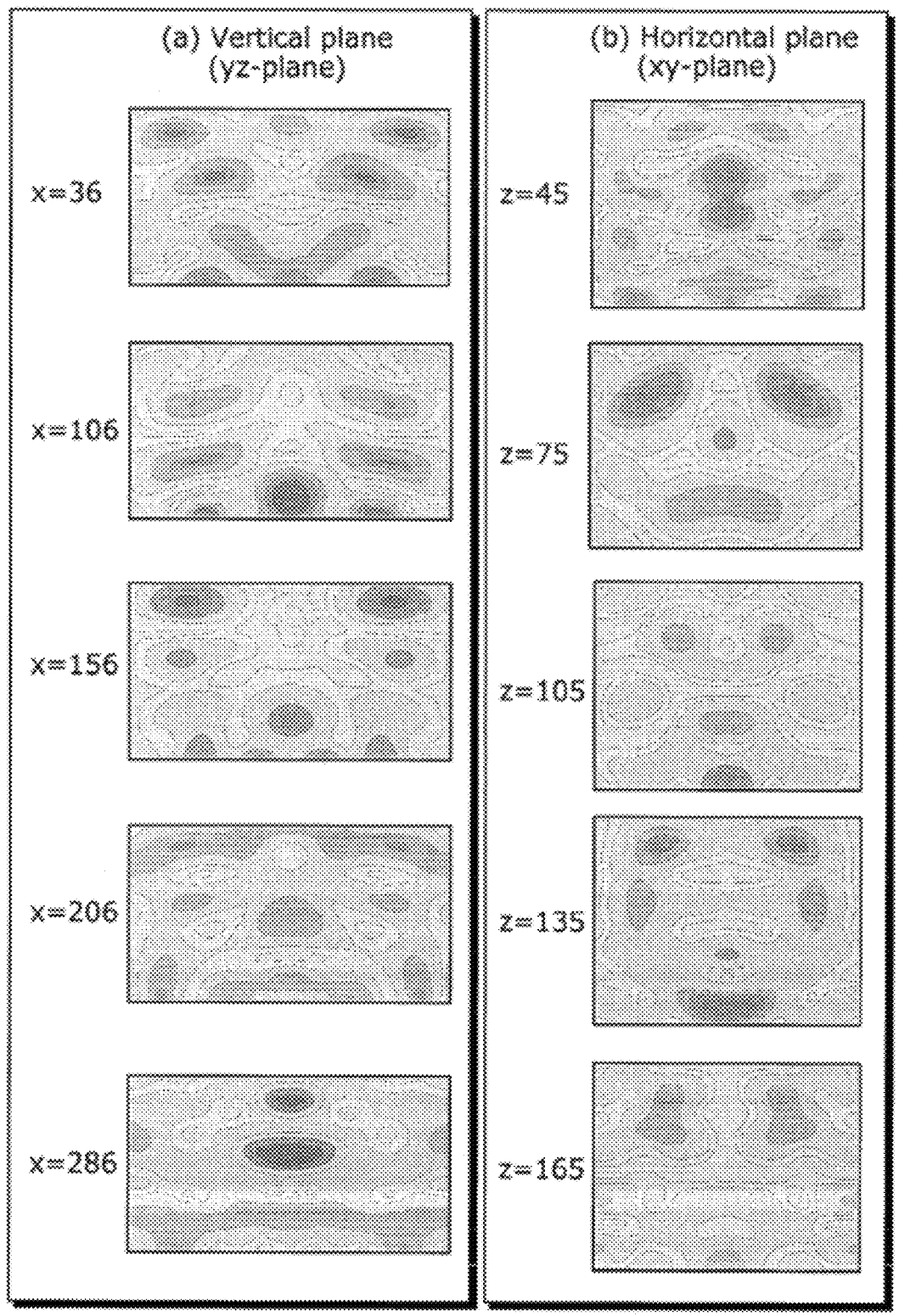
FIG. 6B is a diagram showing the distribution of the intensity of the electromagnetic field composed of a standing wave in the in-phase mode in the heating chamber of the radio-frequency heating apparatus, in which the center distance between adjacent antennas is 90 mm.

FIG. 6B is a diagram showing the distribution of the intensity of the electromagnetic field composed of a standing wave in the heating chamber 101 when radio-frequency waves are radiated in the in-phase mode in the radio-frequency heating apparatus 100 shown in FIG. 6A. Specifically, FIG. 6B is a diagram showing a simulation result of the distribution of the intensity of the electromagnetic field in the heating chamber 101 when it is assumed that radio-frequency waves having a frequency of 2450 MHz are radiated from the antennas 104a and 104b where darker the area, more intense electromagnetic field is generated in the area. An area where the electromagnetic field is more intense corresponds to an antinode of the standing wave, and an area where the electromagnetic field is less intense corresponds to a node of the standing wave.

FIG. 6B($a$) shows the distribution of the intensity of the electromagnetic field composed of a standing wave on some vertical planes (yz-plane), and more specifically the distribution of the intensity of the electromagnetic field composed of a standing wave, on each of the vertical planes (yz-plane) located 36 mm, 106 mm, 156 mm, 206 mm, and 286 mm away from the front surface (x=0) in the depth direction (x) of the heating chamber 101. In addition, FIG. 6B($b$) shows the distribution of the intensity of the electromagnetic field composed of a standing wave on some horizontal planes (xy-plane), and more specifically the distribution of the intensity of the electromagnetic field composed of a standing wave, on each of the horizontal planes (xy-plane) located 45 mm, 75 mm, 105 mm, 135 mm, and 165 mm away from the bottom surface (z=0) in the height direction (z) of the heating chamber 101.

Figure 7A:
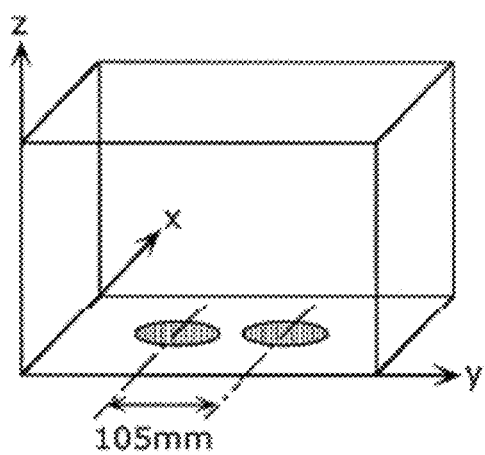
FIG. 7A is a perspective view schematically showing the configuration of a radio-frequency heating apparatus, in which the center distance between adjacent antennas is 105 mm.
Figure 7B:
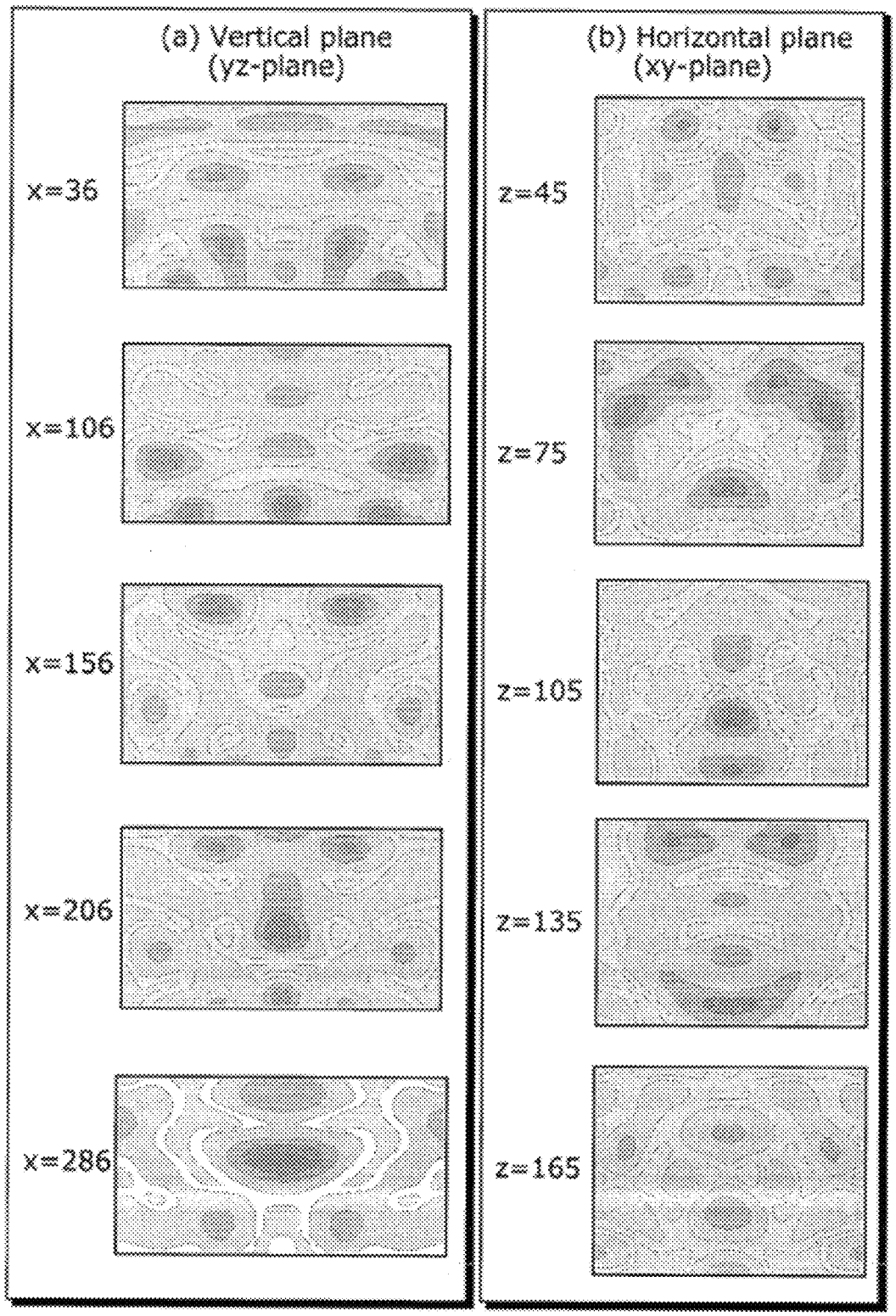
FIG. 7B is a diagram showing the distribution of the intensity of the electromagnetic field composed of a standing wave in the in-phase mode in the heating chamber of the radio-frequency heating apparatus, in which the center distance between adjacent antennas is 105 mm.

FIG. 7A is a perspective view schematically showing the configuration of the radio-frequency heating apparatus 100, in which the center distance between adjacent antennas is 105 mm. FIG. 7B is a diagram in showing the distribution of the intensity of the electromagnetic field composed of a standing wave in the heating chamber 101 in the in-phase mode in the radio-frequency heating apparatus 100 shown in FIG. 7A.

Figure 8A:
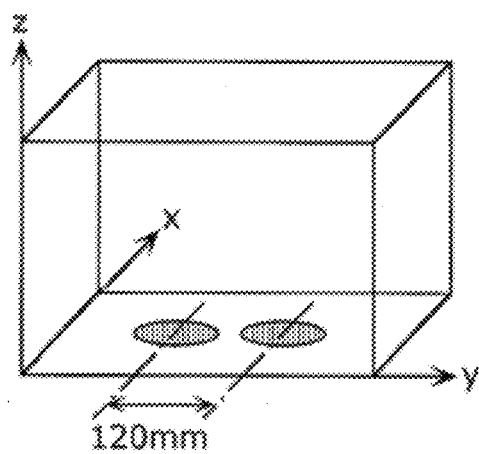
FIG. 8A is a perspective view schematically showing the configuration of a radio-frequency heating apparatus, in which the center distance between adjacent antennas is 120 mm.
Figure 8B:
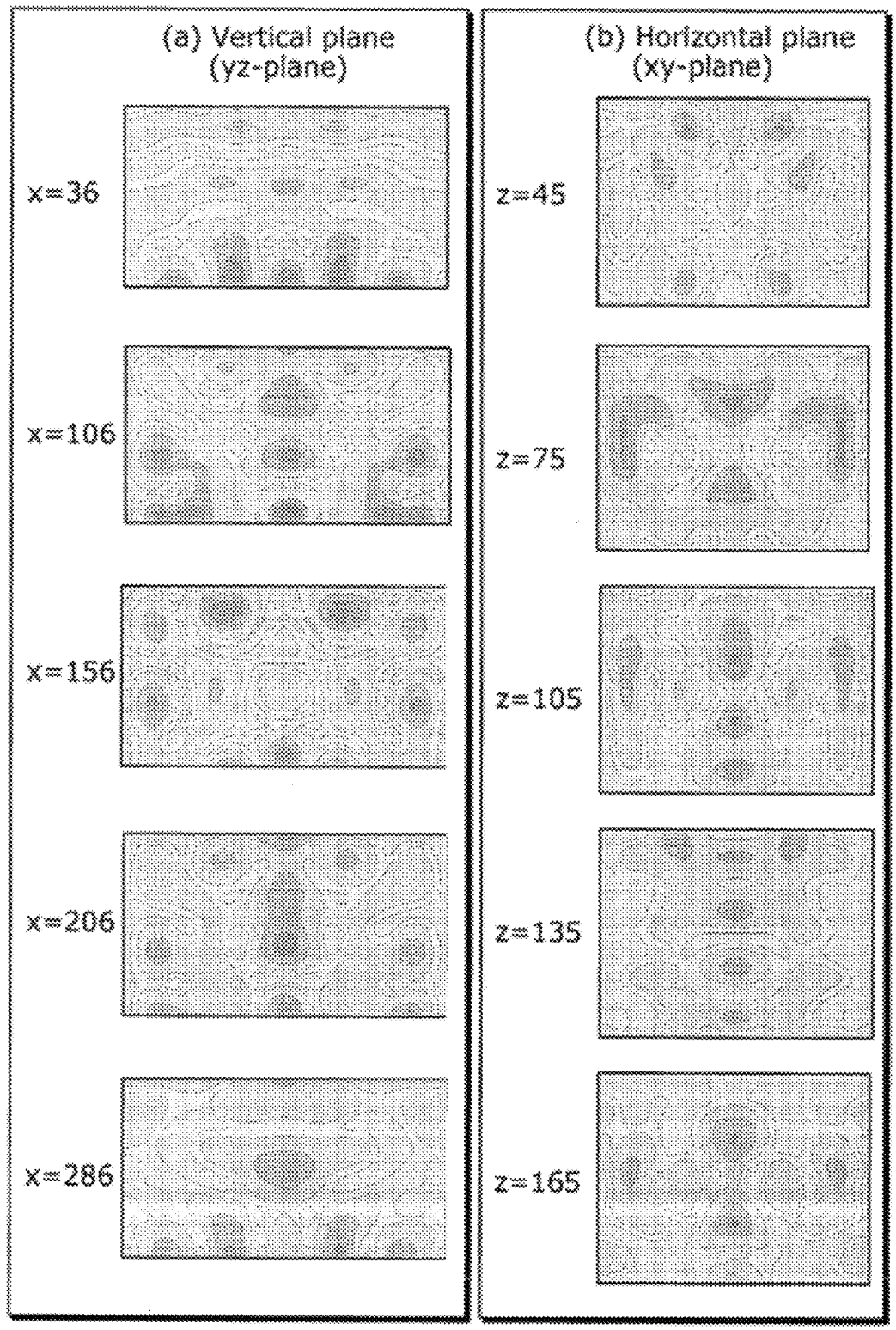
FIG. 8B is a diagram showing the distribution of the intensity of the electromagnetic field composed of a standing wave in the in-phase mode in the heating chamber of the radio-frequency heating apparatus, in which the center distance between adjacent antennas is 120 mm.

FIG. 8A is a perspective view schematically showing the configuration of the radio-frequency heating apparatus 100, in which the center distance between adjacent antennas is 120 mm. FIG. 8B is a diagram showing the distribution of the intensity of the electromagnetic field composed of a standing wave, in the heating chamber 101 in the in-phase mode in the radio-frequency heating apparatus 100 shown in FIG. 8A.

Figure 9A:
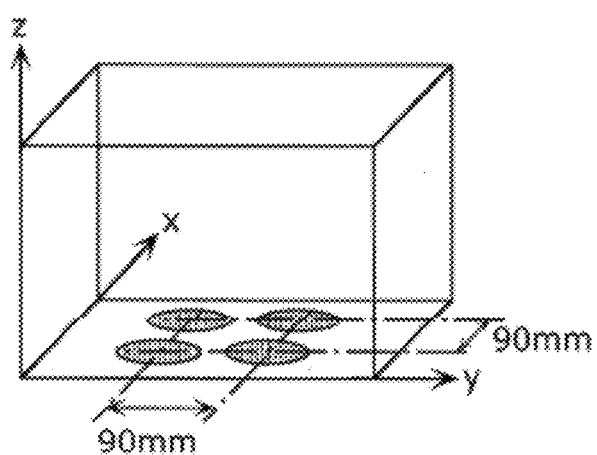
FIG. 9A is a perspective view schematically showing the configuration of a radio-frequency heating apparatus having four antennas, in which the center distance between adjacent antennas is 90 mm.
Figure 9B:
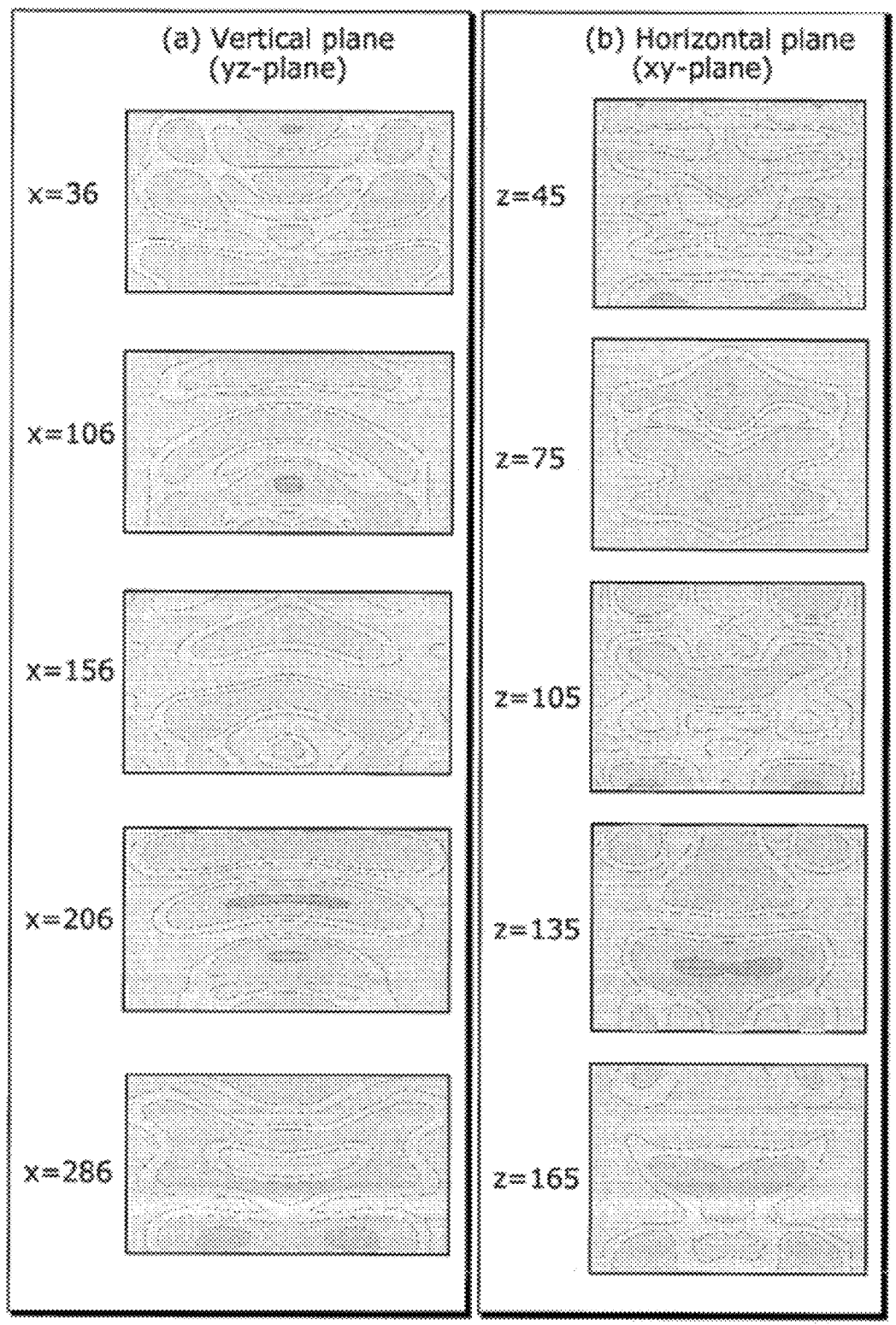
FIG. 9B is a diagram showing the distribution of the intensity of the electromagnetic field composed of a standing wave in the in-phase mode in the heating chamber of the radio-frequency heating apparatus having four antennas, in which the center distance between adjacent antennas is 90 mm.

FIG. 9A is a perspective view schematically showing the configuration of the radio-frequency heating apparatus 100 having four antennas, in which the center distance between adjacent antennas is 90 mm. In the radio-frequency heating apparatus 100 shown in the figure, the phases of the radio-frequency waves radiated from all the antennas are the same in the in-phase mode. FIG. 9B is a diagram showing the distribution of the intensity of the electromagnetic field composed of a standing wave in the heating chamber 101 in the in-phase mode in the radio-frequency heating apparatus 100 shown in FIG. 9A.

FIGS. 7B(a), 7B(b), FIGS. 8B(a), 8B(b), and FIGS. 9B(a), 9B(b) each show the distribution of the intensity of the electromagnetic field composed of a standing wave, on the planes at the same locations as in FIGS. 6B(a), 6B(b).

In each of FIGS. 6B, 7B, 8B, and 9B, it can be observed that the distribution of the intensity of the electromagnetic field composed of a standing wave, in the heating chamber 101 has the same intensity area extending in the horizontal direction, and thus is layered in the vertical direction. Accurately described, when the phase difference between the respective radio-frequency waves radiated from the antennas 104a and 104b indicates the in-phase mode, the distribution of the intensity of the electromagnetic field composed of a standing wave, in the heating chamber 101 has the same intensity area extending in the direction parallel to the plane on which the antennas 104a and 104b are placed, and thus is layered in the vertical direction. That is to say, the region where the electromagnetic field is more intense and the region where the electromagnetic field is less intense extend in the horizontal direction, and thus the regions are layered in the vertical direction. This is because the phases of the radio-frequency waves radiated from the respective antennas 104a and 104b are in phase, and thus when the radio-frequency waves radiated from the respective antennas 104a and 104b interact with each other, the radio-frequency power is amplified.

When the antennas 104a and 104b are placed in the bottom surface of the heating chamber 101 like in the present embodiment, the distribution of the intensity of the electromagnetic field composed of a standing wave in the in-phase mode is suitable for heating an object having a flat geometry. Hereinafter, the details related to this point are described.

Generally, when an object is placed in a heating chamber and is heated by radiating radio-frequency waves from a plurality of antennas provided in the heating chamber, there are two channels through which the radio-frequency waves radiated from the antenna are absorbed in the object. The first channel is such that the radio-frequency waves radiated from the antenna are directly absorbed in the object (hereinafter, referred to as a direct incidence), and the absorption efficiency of the radio-frequency waves to the object is extremely high. The second channel is such that the radio-frequency waves radiated from the antenna is reflected at least once on the wall surface in the heating chamber (hereinafter, referred to as a diffracted incidence). Under extremely limited conditions of the geometry of the object, and the installation site, the direct incidence may be more dominant in some cases, however, in most cases, the diffracted incidence is more dominant. The rate of absorption of the radio-frequency waves into the object via diffracted incidence varies in accordance with the intensity of the electromagnetic field composed of a standing wave formed in the heating chamber. Absorption from the region where the electromagnetic field intensity is high is increased, while absorption from the region where the electromagnetic field intensity is low is decreased. Thus, by forming a distribution of the intensity of the electromagnetic field suitable to the geometry of the object, absorption of the radio-frequency waves to the object by the diffracted incidence can be made uniform.

Consequently, when the geometry of the object 150 determined based on the geometry information signal 106 is flat geometry, the phases of the phase varying units 103a and 103b are adjusted so that the phase difference between the respective radio-frequency waves radiated from the antennas 104a and 104b indicates the in-phase mode, and then heating process is performed. Accordingly, the distribution of the intensity of the electromagnetic field composed of a standing wave, in the heating chamber 101 is suitable to the geometry of the object 150, and extends in the horizontal direction, and is layered in the vertical direction, and thus the object 150 may be efficiently and uniformly heated.

When the geometry of the object 150 determined based on the geometry information signal 106 is vertically oriented geometry (geometry 2 in step S402) the control unit 130 adjusts the phases of the phase varying units 103a and 103b so that the phase difference between the respective radio-frequency waves radiated from the antennas 104a and 104b indicates the opposite-phase mode (step S404). The process performed when the geometry of the object 150 determined based on the geometry information signal 106 is vertically oriented geometry (geometry 2 in step S402) corresponds to the process performed when the time period for the in-phase mode is determined to be 0 in the process of determining the time period for the in-phase mode and the time period for the opposite-phase mode (step S103) in FIG. 4.

Next, similarly to the case when the geometry of the above-described object 150 is determined to be flat geometry (geometry 1 in step S402), heating process is performed (step S405), and when the heating is completed (Yes in step S406), the whole process is terminated (step S412). However, when the heating process is performed (step S405) after setting the phases of the phase varying units 103a and 103b (step S404) so that phase difference indicates the opposite-phase mode, the difference in the phases of the radio-frequency waves radiated from the antennas 104a and 104b indicates the opposite-phase mode.

In this manner, in the first operation, when the geometry of the object 150 is vertically oriented geometry, the radio-frequency heating apparatus 100 adjusts so that the difference in the phases of the radio-frequency waves radiated from the antennas 104a and 104b indicates the opposite-phase mode. That is to say, when the aspect ratio is less than or equal to the second value, the radio-frequency heating apparatus 100 sets the time period for the in-phase mode to be 0 by adjusting the phase difference between the radio-frequency waves radiated from the antennas 104a and 104b.

Here, the distribution of the intensity of the electromagnetic field composed of a standing wave in the heating chamber 101 is described provided that the phase difference between the respective radio-frequency waves radiated from the antennas 104a and 104b indicates the opposite-phase mode. Hereinafter, the distribution of the intensity of the electromagnetic field composed of a standing wave, in the heating chamber 101 in the opposite-phase mode is described using FIGS. 10 to 13. In FIG. 10, FIG. 11, FIG. 12 and FIG. 13, the distance between the antenna 104a and the antenna 104b and/or the number of antennas are different. In these figures, a difference exists only in the distance between antennas and the number of antennas, however the size of the heating chamber 101, and the frequency of the radio-frequency waves radiated from each antenna are the same between the figures. FIGS. 10(a), 10(b), FIGS. 11(a), 11(b), FIGS. 12(a), 12(b), FIGS. 13(a), 13(b), each show the distribution of the intensity of the electromagnetic field composed of a standing wave, on the planes at the same locations as in FIGS. 6B(a), 6B(b).

Figure 10:
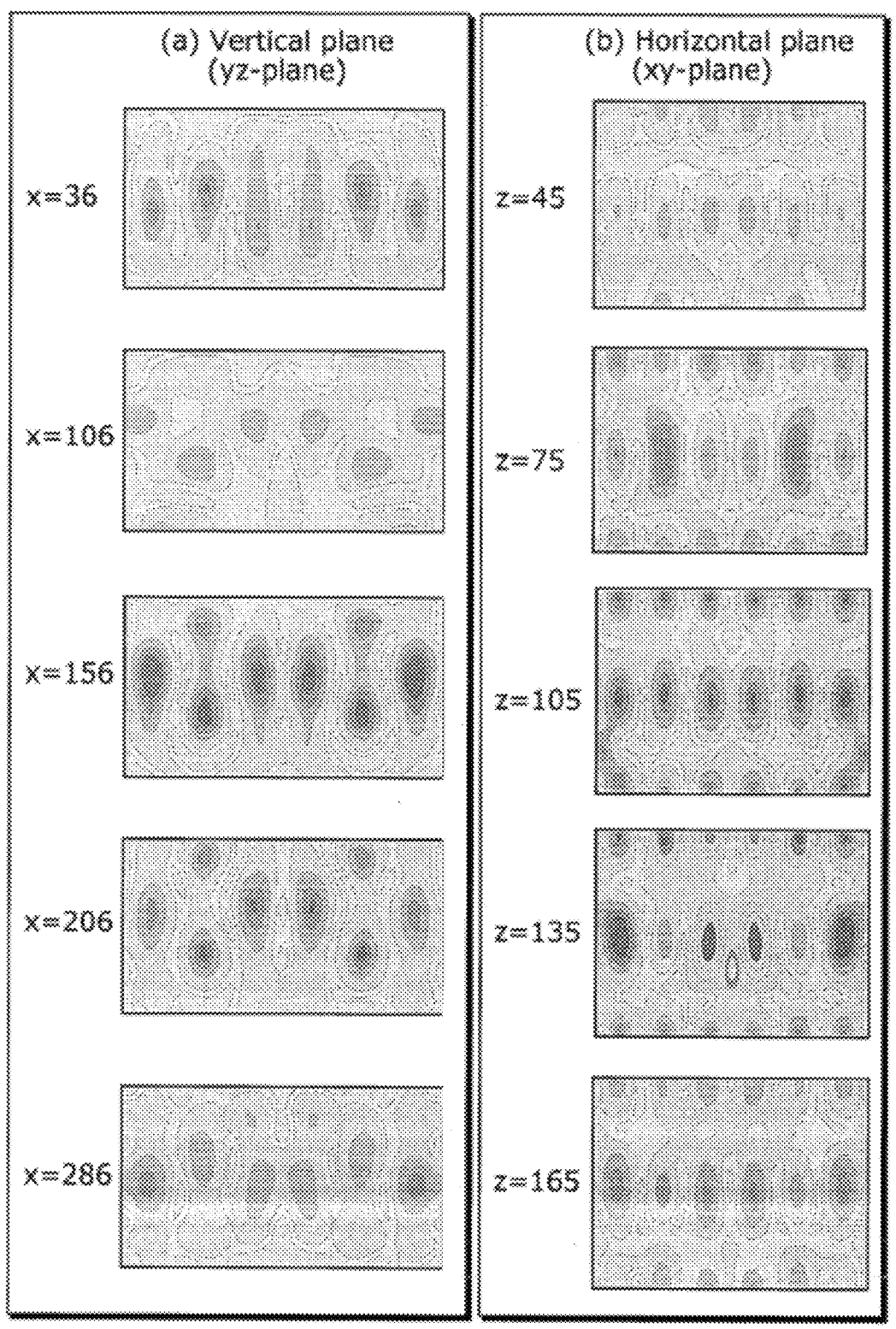
FIG. 10 is a diagram showing the distribution of the intensity of the electromagnetic field composed of a standing wave in the opposite-phase mode in the heating chamber of the radio-frequency heating apparatus, in which the center distance between adjacent antennas is 90 mm, shown in FIG. 6A.

FIG. 10 is a diagram showing the distribution of the intensity of the electromagnetic field composed of a standing wave in the heating chamber 101 of the radio-frequency heating apparatus when radio-frequency waves are radiated in the opposite-phase mode, in which the center distance between adjacent antennas is 90 mm, shown in FIG. 6A.

Figure 11:
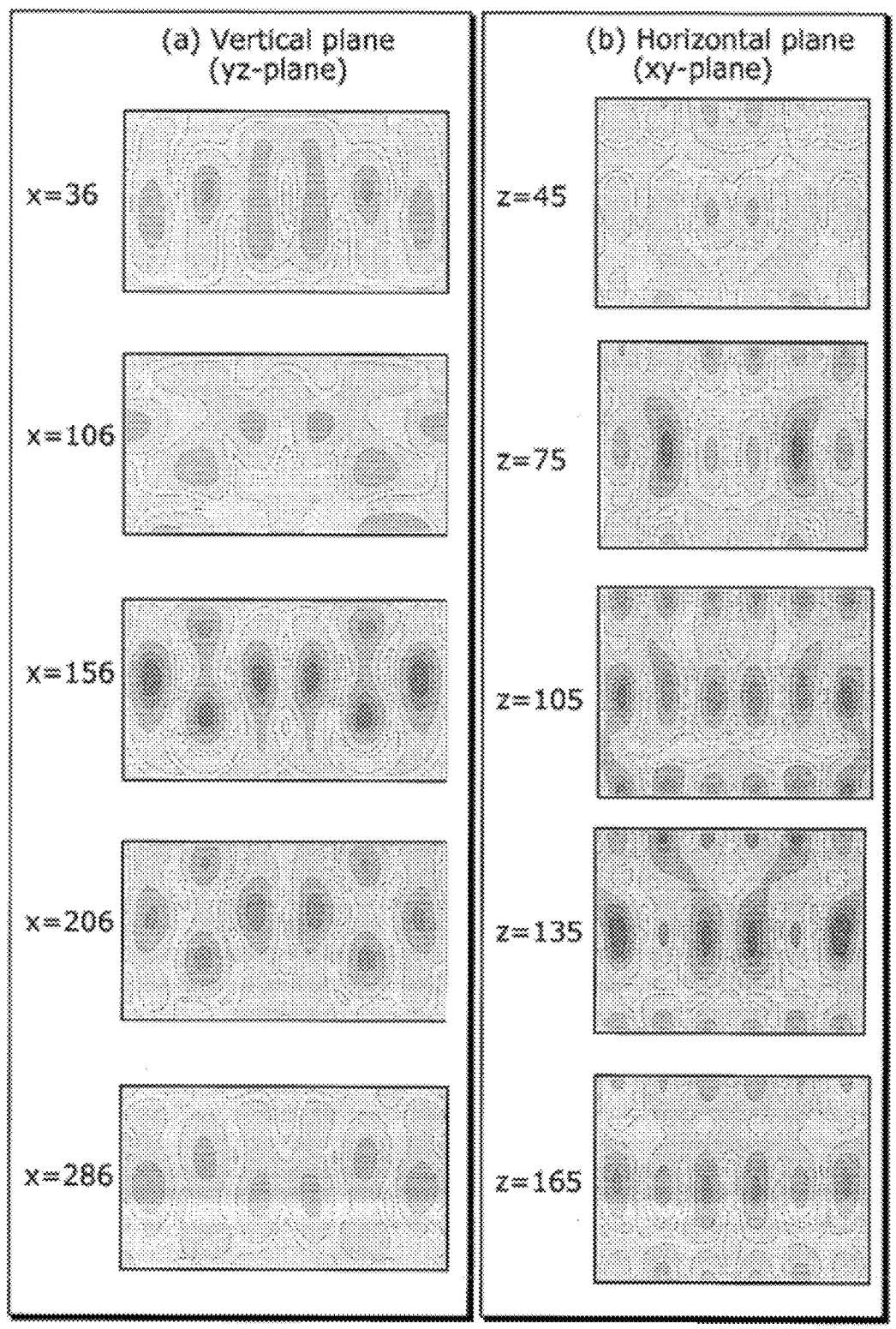
FIG. 11 is a diagram showing the distribution of the intensity of the electromagnetic field composed of a standing wave in the opposite-phase mode in the heating chamber of the radio-frequency heating apparatus, in which the center distance between adjacent antennas is 105 mm, shown in FIG. 7A.

FIG. 11 is a diagram showing the distribution of the intensity of the electromagnetic field composed of a standing wave, in the heating chamber 101 in the opposite-phase mode in the radio-frequency heating apparatus, in which the center distance between adjacent antennas is 105 mm, shown in FIG. 7A.

Figure 12:
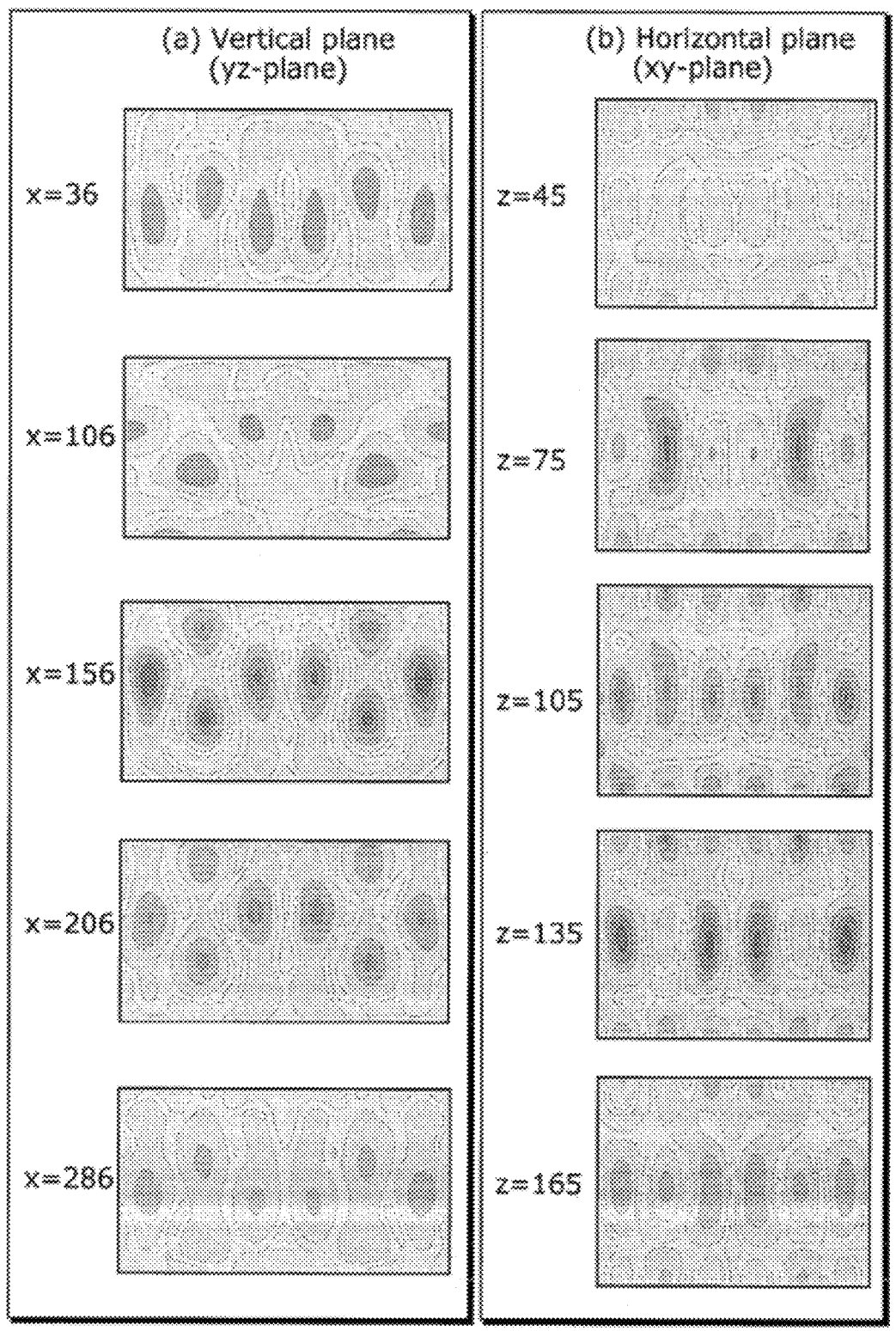
FIG. 12 is a diagram showing the distribution of the intensity of the electromagnetic field composed of a standing wave in the opposite-phase mode in the heating chamber of the radio-frequency heating apparatus, in which the center distance between adjacent antennas is 120 mm, shown in FIG. 8A.

FIG. 12 is a diagram showing the distribution of the intensity of the electromagnetic field composed of a standing wave, in the heating chamber 101 in the opposite-phase mode in the radio-frequency heating apparatus, in which the center distance between adjacent antennas is 120 mm, shown in FIG. 8A.

Figure 13:
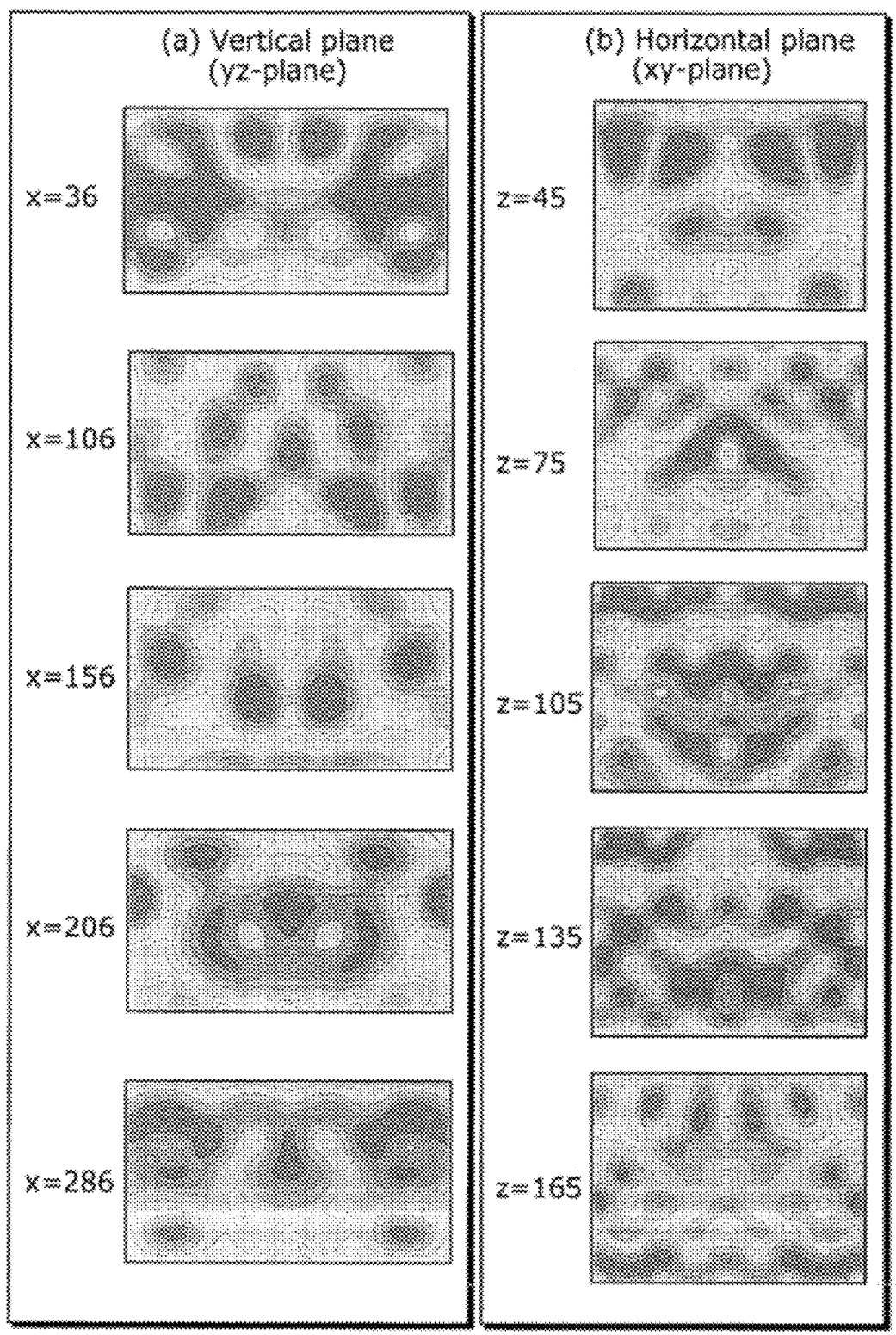
FIG. 13 is a diagram showing the distribution of the intensity of the electromagnetic field composed of a standing wave in the opposite-phase mode in the heating chamber of the radio-frequency heating apparatus having four antennas, in which the center distance between adjacent antennas is 90 mm, shown in FIG. 9A.

FIG. 13 is a diagram showing the distribution of the intensity of the electromagnetic field composed of a standing wave, in the heating chamber 101 in the opposite-phase mode in the radio-frequency heating apparatus having four antennas, in which the center distance between adjacent antennas is 90 mm, shown in FIG. 9A.

In any of FIGS. 10 to 13, it can be observed that the distribution of the intensity of the electromagnetic field composed of a standing wave, in the heating chamber 101 has the same intensity area cylindrically extending in the vertical direction, and thus is layered in the horizontal direction. Accurately described, when difference between the phases of the respective radio-frequency waves radiated from the antennas 104a and 104b indicates the opposite-phase mode, the distribution has the same intensity area cylindrically extending in the direction perpendicular to the plane in which the antennas 104a and 104b are placed, and thus is layered in the horizontal direction. That is to say, the region where the electromagnetic field is more intense and the region where the electromagnetic field is less intense extend in the vertical direction, and thus the regions are layered in the horizontal direction. This is because the phases of the radio-frequency waves radiated from the respective antennas 104a and 104b are in opposite phase, and thus when the radio-frequency waves radiated from the respective antennas 104a and 104b interact with each other, the radio-frequency waves are cancelled each other.

As described above, in order to efficiently and uniformly heat an object, the distribution of the intensity of the electromagnetic field suited to the geometry of the object needs to be formed. Thus, the distribution of the intensity of the electromagnetic field composed of a standing wave, extending in the vertical direction when radio-frequency waves are radiated from the antennas in the opposite-phase mode is suitable for heating of an object having vertically oriented geometry.

Therefore, when the geometry of the object 150 determined based on the geometry information signal 106 is vertically oriented geometry, the phases of the phase varying units 103a and 103b are adjusted so that the phase difference between the respective radio-frequency waves radiated from the antennas 104a and 104b indicates the opposite-phase mode, and then heating process is performed. Accordingly, the distribution of the intensity of the electromagnetic field composed of a standing wave, in the heating chamber 101 is suitable to the geometry of the object 150, and cylindrically extends in the vertical direction and is layered in the horizontal direction, and thus the object 150 may be efficiently and uniformly heated.

When the geometry of the object 150 determined based on the geometry information signal 106 is cube-like geometry (geometry 3 in step S402), the control unit 130 adjusts the phases of the phase varying units 103a and 103b so that the phase difference between the respective radio-frequency waves radiated from the antennas 104a and 104b indicates the in-phase mode (step S407). The process performed when the geometry of the object 150 determined based on the geometry information signal 106 is cube-like geometry (geometry 3 in step S402) corresponds to the process performed when the time period for the in-phase mode is determined to be ta, and the time period for the opposite-phase mode is determined to be tb in the process of determining the time period for the in-phase mode and the time period for the opposite-phase mode (step S103) in FIG. 4.

Next, heating process is performed until a predetermined time ta (for example, ta=1 sec) elapses (step S408). That is to say, the phase difference between the radio-frequency waves radiated from the antennas 104a and 104 is set to indicate the in-phase mode. Then, the distribution of the intensity of the electromagnetic field composed of a standing wave, in the heating chamber 101 extends in the direction parallel to the bottom surface and is layered in the vertical direction, and thus the top surface and the bottom surface of the object 150 may be efficiently and uniformly heated.

Next, after a predetermined time ta elapses, the control unit 130 adjusts the phases of the phase varying units 103a and 103b so that the phase difference between the respective radio-frequency waves radiated from the antennas 104a and 104b indicates the opposite-phase mode (step S409).

Next, heating process is performed until a predetermined time tb (for example, tb=1 sec) elapses (step S410). That is to say, the phase difference between the radio-frequency waves radiated from the antennas 104a and 104 is set to indicate the opposite-phase mode. Then, the distribution of the intensity of the electromagnetic field composed of a standing wave, in the heating chamber 101 cylindrically extends in the direction perpendicular to the bottom surface, and is layered in the direction parallel to the bottom surface, and thus the object 150 may be efficiently and uniformly heated.

Next, similarly to the case when the geometry of the above-described object 150 is determined to be flat geometry (geometry 1 in step S402) or vertically oriented geometry (geometry 2 in step S402), it is determined whether or not heating is completed (step S411). Steps S403 to S411 correspond to the process of heating the object 150 shown in FIG. 4 (step S104).

When the heating is not completed (No in step S411), the heating process in the in-phase mode and the heating process in the opposite-phase mode are alternately repeated with predetermined time periods ta and tb, respectively (steps S407 to S411). On the other hand, when the heating is completed (Yes in step S411), the whole process is terminated (step S412).

In this manner, in the first operation, when the geometry of the object 150 is cube-like geometry, the radio-frequency heating apparatus 100 adjusts the phase difference between the respective radio-frequency waves radiated from the antennas 104a and 104b so as to alternately switch between the in-phase mode and the opposite-phase mode with predetermined time periods, and then performs heating process. In other words, when the identified aspect ratio is greater than the second value and less than the first value, the radio-frequency heating apparatus 100 adjusts the phase difference between the respective radio-frequency waves radiated from the antennas 104a and 104b so as to alternately switch between the in-phase mode and the opposite-phase mode.

Accordingly, the distribution of the intensity of the electromagnetic field composed of a standing wave, in the heating chamber 101 alternately forms the state where the distribution extends in the horizontal direction and is layered in the vertical direction, and the state where the distribution cylindrically extends in the vertical direction and is layered in the horizontal direction. Consequently, when the object 150 has a cube-like geometry, the radio-frequency waves due to the diffracted incidence are uniformly absorbed by the entire object 150, and thus the object 150 may be efficiently and uniformly heated.

As described above, in the radio-frequency heating apparatus 100 according to the present embodiment, when the aspect ratio of the object 150 identified is greater than or equal to the first value which is greater than 1, the above-described first operation sets the phase difference between the radio-frequency waves radiated from the antennas 104a and 104b to indicate the in-phase mode, while when the identified aspect ratio is less than or equal to the second value which is less than 1, the operation sets the phase difference between the radio-frequency waves radiated from the antennas 104a and 104b to indicate the opposite-phase mode. In addition, when the identified ratio is greater than the second value and less than the first value, the radio-frequency heating apparatus 100 adjusts the phase difference between the respective radio-frequency waves radiated from the antennas 104a and 104b so as to alternately switch between the in-phase mode and the opposite-phase mode.

For example, as show in FIG. 14A, the object 150 has a relatively flat (horizontally oriented) geometry such as food served on a plate or steak meat wrapped in a wrap, heating is performed by setting the phase difference between the respective radio-frequency waves radiated from the antennas 104a and 104b to indicate the in-phase mode. On the other hand, as shown in FIG. 14B, when the object 150 has relatively vertical oriented geometry such as a cup or a sake bottle, heating is performed by setting the phase difference between the respective radio-frequency waves radiated from the antennas 104a and 104b to indicate the opposite-phase mode. That is to say, when the surface in which the antennas 104a and 104b are placed is the bottom surface or the top surface of the heating chamber 101, and the object 150 is a food served on a plate, the control unit 130 sets the time period for the in-phase mode to be 0 by adjusting the phase difference between the radio-frequency waves radiated from the antennas 104a and 104b. When the object 150 is sake in a sake bottle, the control unit 130 sets the time period for the in-phase mode to be 0 by adjusting the phase difference between the radio-frequency waves radiated from the antennas 104a and 104b. When the object 150 has cube-like geometry such as food piled up on a plate, or a deep range pack or a deep bowl, the control unit 130 alternately switches between the in-phase mode and the opposite-phase mode by adjusting the phase difference between the radio-frequency waves radiated from the antennas 104a and 104b.

Therefore, heating process can be performed in a state where distribution with an appropriate electromagnetic field intensity is provided in accordance with the geometry of the object 150, and thus the object may be efficiently and uniformly heated.

In the above description, when the geometry of the object 150 is cube-like geometry (geometry 3 in step S402), time ta during which heating process is performed in the in-phase mode, and time tb during which heating process is performed in the opposite-phase mode are defined such that ta=1 sec, tb=1 sec, however, these times can be arbitrarily set depending application. Specifically, when the geometry of the object 150 is determined to be cube-like geometry (geometry 3 in step S402), for the application of heating, for example, an object having a relatively flat geometry such as food served on a plate, the times ta and tb may be set such that ta>tb (for example, ta=2 sec, tb=1 sec). Alternatively, for the application of heating, for example, an object having a relatively vertical oriented geometry such as a drink in a cup or a sake bottle, the times ta and tb may be set such that ta<tb (for example, ta=1 sec, tb=2 sec). That is to say, larger the aspect ratio, larger ratio between the time ta for the in-phase mode and time tb for the opposite-phase mode may be set by adjusting the phase difference between the radio-frequency waves radiated from the antennas 104a and 104b.

Accordingly, the distribution of the intensity of the electromagnetic field, in the heating chamber 101 has the same intensity area extending in the direction parallel to the surface in which the antennas 104a and 104b are placed, and thus is layered in the vertical direction. Consequently, a distribution of the electromagnetic field intensity well suited to the geometry of the object 150 is provided, and thus the object 150 can be uniformly heated securely with efficiency.

In the first operation of the radio-frequency heating apparatus 100, when the geometry of the object 150 is a cube-like geometry (geometry 3 in step S402), alternate switching control between the in-phase mode and the opposite-phase mode has been described, however, control may be fixed to either one of the in-phase mode or the opposite-phase mode. Accordingly, heating process may be performed with much simpler control.

(Second Operation)

Next, a second operation as another specific example of the basic operation of the above-described radio-frequency heating apparatus 100 is described.

In contrast to the first operation, in the present operation, when the object 150 has a flat geometry, heating is performed with the time period for the in-phase mode being longer than the time period for the opposite-phase mode; when the object 150 has a vertically oriented geometry, heating is performed with the time period for the opposite-phase mode being longer than the time period for the in-phase mode; and when the object 150 has a cube-like geometry, heating is performed with the time period for the in-phase mode being equal to the time period for the opposite-phase mode. In other to words, in the present operation, when the aspect ratio of the object 150 identified by the control unit 130 is 1, heating is performed with in-phase time period for the radio-frequency waves radiated from the antennas 104a and 104b being equal to opposite-phase time period for the radio-frequency waves radiated from the antennas 104a and 104b. In addition, when the aspect ratio of the object 150 identified by the control unit 130 is greater than 1, heating is performed with the in-phase time period for the radio-frequency waves radiated from the antennas 104a and 104b being longer than the opposite-phase time period for the radio-frequency waves radiated from the antennas 104a and 104b. In addition, when the aspect ratio of the object 150 identified by the control unit 130 is less than 1, heating is performed with the in-phase time period for the radio-frequency waves radiated from the antennas 104a and 104b being shorter than the opposite-phase time period for the radio-frequency waves radiated from the antennas 104a and 104b.

FIG. 15 is a flowchart showing the control procedure of the second operation of the radio-frequency heating apparatus 100 shown in FIG. 1

The radio-frequency heating apparatus 100 of FIG. 1 performs the following process in the control unit 130.

First, when the object 150 is placed in the heating chamber 101 and an operation to start heating process is performed by a user (step S700), the control unit 130 operates the geometry information acquisition unit 120 to acquire the geometry information of the object 150 (step S701). Here step S701 corresponds to the process of acquiring the geometry information of the object 150 shown in FIG. 4 (step S101) and the process of acquiring the geometry information of the object 150 by operating the geometry information acquisition unit 120 shown in FIG. 5 (step S401).

Next, the geometry of the object 150 is determined based on the geometry information signal 106 inputted from the geometry information acquisition unit 120 (step S702). Specifically, it is determined whether the object 150 has a flat geometry (geometry 1), vertically oriented geometry (geometry 2), or cube-like geometry (geometry 3) by identifying the aspect ratio of the object 150. For example, when the identified ratio is 1, the object 150 is determined to have cube-like geometry (geometry 3); when the identified ratio is greater than 1, the object 150 is determined to have flat geometry (geometry 1); and when the identified ratio is less than 1, the object 150 is determined to have vertically oriented geometry (geometry 2). The identified ratio may be substantially 1, and is preferably in a range of 0.8 to 1.2, and is allowed to be in a range of 0.7 to 1.5. Here, the process of determining the geometry information of the object 150 (step S702) corresponds to the process of determining the geometry information of the object 150 shown in FIG. 4 (step S102).

When the geometry of the object 150 determined based on the geometry information signal 106 has relatively flat (horizontally oriented) geometry (geometry 1 in step S702), time ta during which heating process is performed in the in-phase mode and time tb during which heating process is performed in the opposite-phase mode are defined such that ta>tb (for example, ta=2 sec, tb=1 sec) (step S703). When the geometry of the object 150 determined based on the geometry information signal 106 has vertically oriented geometry (geometry 2 in step S702), time ta during which heating process is performed in the in-phase mode and time tb during which heating process is performed in the opposite-phase mode are defined such that ta<tb (for example, ta=1 sec, tb=2 sec) (step S704). When the geometry of the object 150 determined based on the geometry information signal 106 has cube-like geometry (geometry 3 in step S702), time ta during which heating process is performed in the in-phase mode and time tb during which heating process is performed in the opposite-phase mode are defined such that ta=tb (for example, ta=1 sec, tb=1 sec) (step S705). The process (steps S703 to S705) in which the values of ta and tb of are set is another example of the process of determining the time period for the in-phase mode and in the time period for the opposite-phase mode shown in FIG. 4 (step S103). Specifically, the process corresponds to the determination of the geometry of the object 150 based on the geometry information signal 106, followed by the determination of the time period ta for the in-phase mode, and the time period tb for the opposite-phase mode in accordance with the determined geometry.

Next, the phases of the phase varying units 103a and 103b are adjusted so that the phase difference between the respective radio-frequency waves radiated from the antennas 104a and 104b indicates the in-phase mode (step S706). Then, heating process is performed until the time ta elapses where ta has been set in the process (steps S703 to S705) in which the values of ta and tb of are set (step S707). After time ta elapses, the control unit 130 adjusts the phases of the phase varying units 103a and 103b so that the phase difference between the respective radio-frequency waves radiated from the antennas 104a and 104b indicates the opposite-phase mode (step S708). Then, heating process is performed until the time tb elapses where tb has been set in the process (steps S703 to S705) in which the values of ta and tb of are set (step S709). Similarly to the first operation, it is determined whether or not heating is completed (step S710). The process of repeating alternate switching (steps S706 to S710) between the in-phase mode and the opposite-phase mode until heating is completed (Yes in step S710) corresponds the process of heating the object 150 shown in FIG. 4 (step S104).

When the heating is not completed (No in step S710), the heating process in the in-phase mode and the heating process in the opposite-phase mode are alternately repeated with predetermined time periods ta and tb, respectively (steps S706 to S710). On the other hand, when the heating is completed (Yes in step S711), the whole process is terminated (step S711).

As described above, in the radio-frequency heating apparatus 100 according to the present embodiment, the above-described second operation performs the following: when the object 150 has flat geometry, heating is performed with the time period for the in-phase mode being longer than the time period for the opposite-phase mode; when the object 150 has vertically oriented geometry, heating is performed with the time period for the opposite-phase mode being longer than the time period for the in-phase mode; and when the object 150 has cube-like geometry, heating is performed with the time period for the in-phase mode being equal to the time period for the opposite-phase mode. That is to say, heating process is performed by alternately switching between the in-phase mode and the opposite-phase mode with the ratio of the time periods for the respective modes being changed in accordance with the geometry of the object 150, which is radiated with the respective radio-frequency waves from the antennas 104a and 104b with the relevant phase difference.

When the geometry of the object 150 has relatively flat (horizontally oriented) geometry, heating process time period ta during which the distribution of the electromagnetic field intensity extends horizontally and is layered vertically is longer than heating process time period tb during which the distribution of the electromagnetic field intensity extends vertically and is layered horizontally. Here, the distribution of the electromagnetic field intensity means the distribution of the intensity of the electromagnetic field composed of a standing wave in the heating chamber 101. Consequently, uniform heating in the horizontal direction is performed in more-focused manner, while uniform heating in the vertical direction is performed, and thus the radio-frequency waves due to the diffracted incidence are uniformly absorbed by the entire object 150, and thus the object 150 may be efficiently and uniformly heated.

When the geometry of the object 150 has vertically oriented geometry, the heating process time period tb during which the distribution of the electromagnetic field intensity cylindrically extends vertically and is layered horizontally is longer than the heating process time period ta during which the distribution of the electromagnetic field intensity extends horizontally and is layered vertically. Consequently, uniform heating in the vertical direction is performed in more-focused manner, while uniform heating in the horizontal direction is performed, and thus the radio-frequency waves due to the diffracted incidence are uniformly absorbed by the entire object 150, and thus the object 150 may be efficiently and uniformly heated.

When the geometry of the object 150 has cube-like geometry, the heating process time period tb during which the distribution of the electromagnetic field intensity cylindrically extends vertically and is layered horizontally is the same as the heating process time period ta during which the distribution of the electromagnetic field intensity extends horizontally and is layered vertically. Because time period ta and time period tb are repeated with the same interval, uniform heating in the vertical direction and the horizontal direction are repeated with the same ratio. Consequently, the radio-frequency waves due to the diffracted incidence are uniformly absorbed by the entire object, and thus the object may be efficiently and uniformly heated.

As described above, the radio-frequency heating apparatus 100 according to the present embodiment controls the phase setting of the phase varying units 103a and 103b based on the geometry information of the object 150 acquired by the geometry information acquisition unit 120, thereby setting the phase difference between the respective radio-frequency waves radiated from the antennas 104a and 104b. Therefore, heating process can be performed in a state where distribution with an appropriate electromagnetic field intensity is provided in accordance with the geometry of the object 150, and thus the object 150 may be efficiently and uniformly heated.

In the above-described embodiment, the geometry of the object 150 is determined to be either one of the flat geometry (geometry 1), the vertically oriented geometry (geometry 2), and the cube-like geometry (geometry 3), however, the number of geometry to be determined is not limited to three, and may be increased by adding another geometry such as relatively flat geometry or relatively vertical oriented geometry. Alternatively, geometry between the flat geometry and the vertically oriented geometry may be determined without steps, i.e., may be associated with the value of the ratio between the time period ta for heating in the in-phase mode, and the time period tb for heating in the opposite-phase mode. That is to say, in the above-described second operation, the time period ta for radiation in the in-phase mode, and the time period tb for radiation in the opposite-phase mode are predefined in accordance with the aspect ratio of the object 150, however, for example, when the identified aspect ratio of the object 150 is large, the ratio between the time period ta for radiation in the in-phase mode, and the time period tb for radiation in the opposite-phase mode may be increased accordingly.

For example, the values of the above-described ta and tb corresponding to the ratio (Lh/Lv) between the average dimension (Lh) of the object 150 in the direction parallel to the plane where the antennas 104a, 104b are placed, and the average dimension (Lv) of the object 150 in the direction vertical to the plane may be defined in a matrix, which is stored in a memory or the like so that the above-described values ta and tb corresponding to the ratio (Lh/Lv) between the average dimension (Lh) in the horizontal direction and the average dimension (Lv) in the vertical direction may be read from the memory.

FIG. 16 is a diagram showing an example of a matrix which defines values ta and tb corresponding to the ratio (Lh/Lv) between the average dimension (Lh) in the horizontal direction and the average dimension (Lv) in the vertical direction.

For example, when the ratio (Lh/Lv) between the average dimension (Lh) in the horizontal direction and the average dimension (Lv) in the vertical direction is 2, i.e., the average dimension (Lh) in the horizontal direction is twice as much as the average dimension (Lv) in the vertical direction, the matrix shown in FIG. 16 indicates that ta=2 sec and tb=1 sec.

When radiation in the in-phase mode and radiation in the opposite-phase mode are alternately repeated, the radiation in the in-phase mode is performed in the above description, but the radiation in the opposite-phase mode may be performed first.

When the phase difference between the radio-frequency waves radiated from the antennas 104a and 104b is set as in-phase mode, the phase difference may be substantially 0 degree, and is preferably in a range of −5 to +5 degrees, and the range of −10 to +10 degrees is also allowed.

When the phase difference between the radio-frequency waves radiated from the antennas 104a and 104b is set as opposite-phase mode, the phase difference may be substantially 180 degree, and is preferably in a range of −175 to +185 degrees, and the range of −170 to +190 degrees is also allowed.

In the above-described embodiment, the ratio between the dimension of the object 150 in the direction horizontal to the surface in which the antennas 104a and 104b are placed, and the dimension of the object 150 in the direction vertical to the surface is identified, however, the dimension of the object 150 in the vertical direction and the dimension of the object 150 in the horizontal vertical may be compared with each other, and according to a result of the comparison, it may be determined whether radiation in the in-phase mode, or radiation in the opposite-phase mode is performed. Specifically, when the dimension of the object 150 in the vertical direction is smaller than the dimension in the horizontal direction, the object 150 may be determined to have horizontally oriented geometry, and radiation in the in-phase mode may be performed. Alternatively, when the dimension of the object 150 in the vertical direction is larger than the dimension in the horizontal direction, the object 150 may be determined to have vertically oriented geometry, and radiation in the opposite-phase mode may be performed. Alternatively, when the dimension of the object 150 in the vertical direction is substantially equal to the dimension in the horizontal direction, the object 150 may be determined to have cube-like geometry, and radiation in the in-phase mode and radiation in opposite-phase mode may be alternately performed.

[Embodiment 2]

Hereinafter, Embodiment 2 of the present invention is described.

The radio-frequency heating apparatus according to the present embodiment is different from the radio-frequency heating apparatus 100 according to Embodiment 1 in that the geometry information of an object is obtained by user operation. That is to say, the radio-frequency heating apparatus 100 according to Embodiment 1 does not need user operation, for example, geometry information of the object is acquired by an infrared sensor or a laser sensor. On the other hand, the radio-frequency heating apparatus according to the present embodiment does not need a two-dimensional sensors or a three-dimensional sensors such as an infrared sensor or a laser sensor, and acquires the geometry information of the object by user operation.

FIG. 17 is a block diagram showing the basic configuration of a radio-frequency heating apparatus according to Embodiment 2.

The radio-frequency heating apparatus show in the figure is different from the radio-frequency heating apparatus 100 shown in FIG. 1 in that the geometry information of an object 250 is obtained by user operation. That is to say, in the radio-frequency heating apparatus 100 shown in FIG. 1, the control unit 130 identifies the geometry of the object 150, however, in the radio-frequency heating apparatus 200 shown in FIG. 17, the control unit 230 identifies the geometry of the object 250.

Specifically, the radio-frequency heating apparatus 200 is provided with respective geometry selection buttons for the cases of the object 250 having relatively flat (horizontally oriented) geometry such as food served on a plate or steak meat wrapped in a wrap, or having relatively vertical oriented geometry such as a cup or a sake bottle, or having cube-like geometry such as food piled up on a plate, or a deep range pack or a deep bowl, so that geometry information of the object may be acquired by pressing a relevant geometry selection button.

Accordingly, compared with the radio-frequency heating apparatus 100, the radio-frequency heating apparatus 200 does not need the above-mentioned infrared sensor or laser sensor, thus the cost can be reduced and the apparatus can be miniaturized.

Here, a heating chamber 201, a distribution unit 202, a first phase varying unit 203a and a second phase varying unit 203b, a first antenna 204a, a second antenna 204b, a radio-frequency power generation unit 210 shown in FIG. 17 correspond the heating chamber 101, the distribution unit 102, the first phase varying unit 103a and second phase varying unit 103b, the first antenna 104a, the second antenna 104b, and the radio-frequency power generation unit 110 shown in FIG. 1, respectively.

The operation of the radio-frequency heating apparatus 200 according to the present embodiment is described using FIGS. 18 and 19.

FIG. 18 is an overall perspective view of the radio-frequency heating apparatus 200 having a geometry selection button, according to Embodiment 2.

FIG. 19 is a flowchart showing the basic operation of the radio-frequency heating apparatus 200 according to Embodiment 2.

First, the geometry information acquisition unit 220 acquires the geometry information of the object 250 (step S201). As shown in FIG. 18, the radio-frequency heating apparatus 200 is provided with geometry selection buttons SB1 and SB2, which receive a user's designation related to the geometry of the object 250. That is to say, the geometry selection buttons SB1 and SB2 serve as the geometry information acquisition unit 220. For example, the geometry selection button SB1 receives a user's designation that the object 250 has a vertically oriented geometry, while the geometry selection button SB2 receives a user's designation that the object 250 has a horizontally oriented geometry.

Next, the control unit 230 switches from the current mode to a pre-defined mode (in-phase mode or opposite-phase mode) in accordance with the geometry information (step S202). Specifically, when the geometry selection button SB1 receives a user's designation, the control unit 230 sets the phases of the phase varying units 203a and 203b so that the phase difference between the respective radio-frequency waves radiated from the antennas 204a and 204b indicates the opposite-phase mode. On the other hand, when the geometry selection button SB2 receives a user's designation, the control unit 230 sets the phases of the phase varying units 203a and 203b so that the phase difference between the respective radio-frequency waves radiated from the antennas 204a and 204b indicates the in-phase mode.

Finally, the control unit 230 heats the object 250 in the switched mode (step S203).

The in-phase mode and the opposite-phase mode may be switched from each other during heating process in order to achieve pre-defined ratio of time period according to a selected geometry selection button.

The interface of the geometry selection buttons SB1 and SB2 is not limited to the interface shown in FIG. 18, and may be a dial button or a touch panel. Alternatively, there may be provided a button as a geometry selection button which receives a user's designation that the object 250 has cube-like geometry.

Like in Embodiment 2, the geometry information acquisition unit may be provided with a geometry selection button which receive a user's designation related to the geometry of the object. Accordingly, the geometry information acquisition unit can be simplified and the control can be also simplified.

[Embodiment 3]

Hereinafter, Embodiment 3 of the present invention is described.

The radio-frequency heating apparatus according to the present embodiment is different from the radio-frequency heating apparatus 100 according to Embodiment 1 and the radio-frequency heating apparatus 200 according to Embodiment 2 in that the in-phase mode and the opposite-phase mode are switched from each other independently of geometry information. That is to say, Embodiment 1 and Embodiment 2 have a configuration in which the geometry information of the object is acquired, and then the in-phase mode and the opposite-phase mode are switched from each other based on the acquired geometry information, however, the present embodiment has a configuration in which the in-phase mode and the opposite-phase mode are always alternately switched from each other.

With the present embodiment, an infrared sensor, a geometry selection button operated by a user, and the like are not needed. In addition, control based on the geometry information of the object is not needed, and thus the cost can be reduced and the apparatus can be miniaturized. In addition, by alternately switching between the in-phase mode in which an electromagnetic field distribution having the same intensity in the horizontal direction is formed, and the opposite-phase mode in which an electromagnetic field distribution having the same intensity in the vertical direction is formed, efficient, uniform, and stable heating can be achieved consistently without significantly depending on the geometry of the object and arrangement of the object in the heating chamber.

FIG. 20 is a block diagram showing the basic configuration of the radio-frequency heating apparatus according to Embodiment 3.

The radio-frequency heating apparatus 300 shown in the figure is different from the radio-frequency heating apparatus 100 in FIG. 1 and the radio-frequency heating apparatus 200 FIG. 17 in that the geometry information acquisition unit 120 and the geometry information acquisition unit 220 are not provided. That is to say, in the radio-frequency heating apparatus 300, the control unit 330 alternately switches between the in-phase mode and the opposite-phase mode with a predetermined ratio independently of the geometry information.

Here, a heating chamber 301, a distribution unit 302, a first phase varying unit 303a and a second phase varying unit 303b, a first antenna 304a, a second antenna 304b, a radio-frequency power generation unit 310 shown in FIG. 20 correspond the heating chamber 101, the distribution unit 102, the first phase varying unit 103a and second phase varying unit 103b, the first antenna 104a, the second antenna 104b, and the radio-frequency power generation unit 110 shown in FIG. 1, respectively.

The operation of the radio-frequency heating apparatus 300 according to the present embodiment is described using FIG. 21.

FIG. 21 is a flowchart showing the basic operation of the radio-frequency heating apparatus 300 according to Embodiment 3.

The control unit 330 alternately switches between the in-phase mode and the opposite-phase mode with a predetermined ratio (step S302). The predetermined ratio is set depending on the distribution of the electromagnetic field intensity in the in-phase mode, and the distribution of the electromagnetic field intensity in the opposite-phase mode. For example, the ratio between the time period for the in-phase mode and the time period for the opposite-phase mode is preferably set in a range of 2:8 to 8:2. Then the control unit 330 heats the object 350 in one of the modes that are alternately switched (step S303).

According to the present embodiment, the distribution of the electromagnetic field intensity shown in FIG. 6B, 7B, 8B, or 9B, and the distribution of the electromagnetic field intensity shown in FIG. 10, 11, 12, or 13 are alternately formed with a predetermined ratio. Therefore, efficient, uniform, and stable heating can be achieved consistently even when the geometry of the object 350 is vertically long or flat. In addition, as shown in each figure which depicts the above-mentioned distributions of the electromagnetic field intensity, the distribution of the electromagnetic field intensity is uniformly formed over the wide range in the heating chamber 301. Thus, the object 350 can be uniformly heated with efficiency without significantly depending on the arrangement of the object 350 in the heating chamber 301.

In the above, the radio-frequency heating apparatus according to the present invention has been described based on the embodiments, however, the invention is not limited to these embodiments. As long as not departing from the spirit of the present invention, modified embodiments obtained by making various modifications, which occur to those skilled in the art, to the present embodiment, and the embodiments that are constructed by combining the components of different embodiments are also included in the scope of the present invention.

For example, a configuration may be adopted which includes an infrared sensor and a laser sensor which have been described in Embodiment 1 along with a geometry selection button shown in Embodiment 2.

The radio-frequency heating apparatus including a radio-frequency power generation unit, and a plurality of antennas which radiate radio-frequency waves to an object according to the present invention can uniformly heat the object with efficiency independently of the geometry of the object, and thus is useful for cooking household appliances such as a microwave oven.

REFERENCE SIGNS LIST 100, 200, 300 Radio-frequency heating apparatus
101, 201, 301 Heating chamber
102, 202, 302 Distribution unit
103a, 203a, 303a The first phase varying unit (phase varying unit)
103b, 203b, 303b The second phase varying unit (phase varying unit)
104a, 204a, 304a The first antenna (antenna)
104b, 204b, 304b The second antenna (antenna)
105a, 105b Phase setting signal
106 Geometry information signal
110, 210, 310 Radio-frequency power generation units
111 and 113 Oscillation unit
112 Amplification Unit
114 Phase locked loop
115 Frequency control signal
120, 220 Geometry-information acquisition unit
130, 230, 330 Control unit
150, 250, 350 Object
SB1, SB2 Geometry selection button

The invention claimed is:

1. A radio-frequency heating apparatus for heating an object placed in a heating chamber positioned in the radio-frequency heating apparatus, the radio-frequency heating apparatus comprising:

a radio-frequency power generation unit that generates radio-frequency power;

a phase varying unit connected to the radio-frequency power generation unit via a distribution unit and that varies a phase of radio-frequency power generated by the radio-frequency power generation unit;

a plurality of antennas positioned on a same plane in the heating chamber and that radiates a plurality of radio-frequency waves to the object, the radio-frequency waves having a predetermined phase difference as determined by phase variation in the phase varying unit connected to the plurality of antennas;

a geometry information acquisition unit positioned in the radio-frequency heating apparatus and that acquires in a non-contact manner geometry information including the dimensions of the object from the object indicating a geometry of the object; and a control unit connected to the phase varying unit and that controls the phase varying unit so that the radio-frequency waves are in phase in a first mode, and are in opposite phase in a second mode, wherein the control unit switches between the first mode and the second mode based on the geometry information acquired by the geometry information acquisition unit connected to the control unit, and the control unit identifies a ratio between a dimension of the object in a direction parallel to the same plane, and a dimension of the object in a direction perpendicular to the same plane based on the geometry information acquired by the geometry information acquisition unit, and switches between the first mode and the second mode based on the identified ratio.

2. The radio-frequency heating apparatus according to claim 1 wherein the control unit switches between the first mode and the second mode during heating so that a ratio between a time period for the first mode and a time period for the second mode is increased in accordance with an increase in the ratio between the dimension of the object in the direction parallel to the same plane, and the dimension of the object in the direction perpendicular to the same plane.

3. The radio-frequency heating apparatus according to claim 1, wherein the control unit switches to the first mode when the ratio between the dimension of the object in the direction parallel to the same plane, and the dimension of the object in the direction perpendicular to the same plane is greater than or equal to a first value which is greater than 1, and switches to the second mode when the ratio is less or equal to a second value which is less than 1.

4. The radio-frequency heating apparatus according to claim 1, wherein the control unit switches between the first mode and the second mode during heating so as to set a time period for the first mode to be approximately equal to a time period for the second mode when the ratio between the dimension of the object in the direction parallel to the same plane, and the dimension of the object in the direction perpendicular to the same plane is 1.

5. The radio-frequency heating apparatus according to claim 1, wherein the same plane is a bottom surface or a top surface of the heating chamber, the control unit switches to the first mode when the object is a food served on a plate, and switches to the second mode when the object is sake in a sake bottle.

6. The radio-frequency heating apparatus according to claim 1,
    wherein the control unit alternately repeats the first mode and the second mode.

7. The radio-frequency heating apparatus according to claim 1,
    wherein the geometry information acquisition unit is a sensor which detects a contour shape and dimensions of the object.

8. The radio-frequency heating apparatus according to claim 1,
    wherein the geometry information acquisition unit is a geometry selection button which receives designation of a geometry of the object by a user.

9. The radio-frequency heating apparatus according to claim 1,
    wherein the antennas are flat antennas.

\* \* \* \* \*